US010971113B2

(12) United States Patent
Kunitomo et al.

(10) Patent No.: US 10,971,113 B2
(45) Date of Patent: Apr. 6, 2021

(54) DISPLAY SYSTEM, ELECTRONIC DEVICE, AND DISPLAY METHOD

(71) Applicant: SEIKO EPSON CORPORATION, Tokyo (JP)

(72) Inventors: Yuichi Kunitomo, Matsumoto (JP); Kazuma Kitadani, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/228,847

(22) Filed: Dec. 21, 2018

(65) Prior Publication Data

US 2019/0197994 A1 Jun. 27, 2019

(30) Foreign Application Priority Data

Dec. 22, 2017 (JP) .............................. JP2017-246853
Sep. 14, 2018 (JP) .............................. JP2018-172773

(51) Int. Cl.
  *G09G 5/37* (2006.01)
  *G06F 3/14* (2006.01)
  *G02B 27/01* (2006.01)

(52) U.S. Cl.
  CPC .......... *G09G 5/37* (2013.01); *G02B 27/0172* (2013.01); *G06F 3/1454* (2013.01); *G02B 2027/014* (2013.01); *G02B 2027/0138* (2013.01); *G02B 2027/0178* (2013.01); *G09G 2340/12* (2013.01)

(58) Field of Classification Search
None
See application file for complete search history.

(56) References Cited

U.S. PATENT DOCUMENTS

| 2002/0126066 | A1 | 9/2002 | Yasukawa et al. |
| 2012/0242560 | A1 | 9/2012 | Nakada et al. |
| 2014/0340286 | A1* | 11/2014 | Machida ............ G02B 26/0833 345/8 |
| 2015/0061974 | A1 | 3/2015 | Kobayashi |
| 2015/0084857 | A1 | 3/2015 | Kimura |
| 2015/0279110 | A1 | 10/2015 | Kimura et al. |
| 2015/0348322 | A1* | 12/2015 | Ligameri ............ G02B 27/017 345/633 |

FOREIGN PATENT DOCUMENTS

| JP | 2011-059435 A | 3/2011 |
| JP | 2012-204998 A | 10/2012 |
| JP | 2015-049883 A | 3/2015 |
| JP | 2015-188175 A | 10/2015 |
| JP | 2015-227919 A | 12/2015 |
| WO | 95/005620 A1 | 2/1995 |

* cited by examiner

*Primary Examiner* — Nicholas R Wilson
(74) *Attorney, Agent, or Firm* — Oliff PLC

(57) ABSTRACT

A display system including a PC and an HMD, and in the display system, the PC includes an I/F unit configured to output image data, the HMD includes an I/F unit configured to acquire the image data output by the PC, an image display unit configured to superimpose an image on an outside scene visually recognized in a state where the HMD is worn, and to display the image, and a display controller configured to cause the image display unit to display the image data acquired by the I/F unit, and the display controller causes the image display unit to display the image data in correspondence to a position of the PC visually recognized as an outside scene.

14 Claims, 15 Drawing Sheets

DISPLAY SYSTEM, ELECTRONIC DEVICE, AND DISPLAY METHOD

BACKGROUND

1. Technical Field

The invention relates to a display system, an electronic device, and a display method.

2. Related Art

In the related art, a display device configured to receive and display a display image of an external device has been known (for example, see JP-A-2015-227919). JP-A-2015-227919 describes an example in which, to integrate display screens of a plurality of devices, a head mounted type display device (Head Mounted Display: HMD) receives a display image transmitted by an external device and causes a display unit to display the display image.

In a configuration disclosed in JP-A-2015-227919, assuming that all are displayed by the HMD, the display image of the external device can be integrated in display of the HMD. In contrast, in the related art, there is no example proposed for a technique for controlling display by a display device in correspondence to an external device different from the display device.

SUMMARY

An advantage of some aspects of the invention is to control display by a display device in correspondence to an external device.

To address the above-described issue, a display system according to an aspect of the invention includes an electronic device including a first display unit, and a display device having a head mounted type and connected to the electronic device, and in the display system, the electronic device includes an output unit configured to output an image, the display device includes an acquisition unit configured to acquire the image output by the electronic device, a second display unit configured to superimpose an image on an outside scene visually recognized in a state where the display device is worn, and to display the image, and a display controller configured to cause the second display unit to display the image acquired by the acquisition unit, and the display controller is configured to cause the second display unit to display the image in correspondence to a position of the electronic device visually recognized as an outside scene.

According to the aspect of the invention, when the image output by the electronic device is displayed by the display device having a head mounted type, the image is displayed to correspond to the position of the electronic device as the outside scene. For example, the image can be displayed by the display device in correspondence to a position of the first display unit visible as the outside scene. Accordingly, display in correspondence to the position of the electronic device visually recognized as the outside scene can be performed by the display device configured to superimpose the image on the outside scene and to display the image.

Additionally, according to an aspect of the invention, the electronic device includes an electronic device control unit configured to generate an image corresponding to a virtual display area wider than the first display unit, cause the first display unit to display a portion of the image generated, and cause the output unit to output at least a portion of the image generated, and the display controller provided in the display device is configured to cause the second display unit to display at least a portion of an image output by the electronic device, in correspondence to a position of the electronic device.

According to this configuration, the second display unit of the display device can be caused to perform display corresponding to the virtual display area wider than the first display unit of the electronic device. Thus, a display area larger than the first display unit can be displayed in correspondence to the position of the electronic device, and the first display unit can be expanded virtually by the display device.

Additionally, according to an aspect of the invention, the electronic device control unit is configured to cause the output unit to output the image obtained by removing a portion displayed by the first display unit from the image generated in correspondence to the virtual display area, and the display controller provided in the display device is configured to cause the second display unit to display an image output by the electronic device.

According to this configuration, when the display device performs display corresponding to the virtual display area wider than the first display unit of the electronic device, a portion of the image is displayed by the first display unit, and a portion obtained by removing the portion displayed by the first display unit is displayed by the second display unit. Thus, display including display of the electronic device combined with display of the display device can be achieved. For example, a display mode in which an image is displayed around the electronic device by the second display unit and the first display unit is virtually expanded can be achieved by the display device.

Additionally, according to an aspect of the invention, the display controller provided in the display device is configured to cause the image output by the electronic device to be displayed around the first display unit visually recognized as an outside scene.

According to this configuration, the image is displayed by the second display unit of the display device around the first display unit of the electronic device, and accordingly, the display mode in which the first display unit is virtually expanded can be achieved.

Additionally, according to an aspect of the invention, the electronic device control unit is configured to, based on a relative position of the first display unit with respect to the second display unit, cause the first display unit to display a portion of the image generated in correspondence to the virtual display area, and cause the output unit to output the image obtained by removing a portion displayed by the first display unit.

According to this configuration, the electronic device outputs the image displayed by the display device to correspond to the relative position of the first display unit with respect to the second display unit. Thus, an operation in which display corresponding to the position of the first display unit of the electronic device is performed by the display device can be achieved easily.

Additionally, according to an aspect of the invention, the electronic device control unit is configured to, based on a relative position of the first display unit with respect to the second display unit, cause the output unit to output an image obtained by masking a portion displayed by the first display unit, of the image generated in correspondence to the virtual display area.

According to this configuration, since the portion displayed by the first display unit of the electronic device is not displayed by the second display unit, the image displayed by the electronic device and the image displayed by the display device can be coordinated.

Additionally, according to an aspect of the invention, the electronic device control unit is configured to cause the output unit to output the image generated in correspondence to the virtual display area, and the display controller provided in the display device is configured to cause the second display unit to display an image obtained by cutting out a portion of the image output by the electronic device.

According to this configuration, in processing by the display device, a portion of the image displayed by the electronic device can be expanded and displayed by the second display unit.

Additionally, according to an aspect of the invention, the display controller is configured to, based on a relative position of the first display unit with respect to the second display unit, extract a portion of the image acquired by the acquisition unit, and cause the second display unit to display the portion.

According to this configuration, since the display device determines the relative position of the first display unit with respect to the display unit, and generates an image for display to correspond to this relative position, display corresponding to the position of the first display unit can be achieved without increasing a load on the electronic device.

Additionally, according to an aspect of the invention, the display controller is configured to, based on a relative position of the first display unit with respect to the second display unit, cause the second display unit to display an image obtained by masking a portion superimposed on the first display unit, of the image acquired by the acquisition unit.

According to this configuration, in processing by the display device, since the portion displayed by the first display unit is masked in the image displayed by the second display unit, the image displayed by the electronic device and the image displayed by the display device can be coordinated without increasing a load on the electronic device.

Additionally, according to an aspect of the invention, the electronic device control unit is configured to determine a position of the virtual display area, based on a position of the electronic device in a real space, and adjust a display mode of the second display unit, based on a relative position between the virtual display area and the second display unit.

According to this configuration, an image can be displayed by the display device in correspondence to the position of the electronic device in the real space. An effect such as using this image to supplement or expand the image displayed by the first display unit of the electronic device can be obtained.

Additionally, according to an aspect of the invention, the electronic device control unit is configured to initialize a display mode of the image by using a position of the first display unit as a reference, when the electronic device control unit detects the first display unit being present in the range where the first display unit is visually recognized through the second display unit.

According to this configuration, the display mode can be adjusted in correspondence to whether the first display unit of the electronic device can be recognized visually as the outside scene in the display device.

Additionally, according to an aspect of the invention, the second display unit includes a display unit for a left eye configured to emit imaging light toward a left eye of a user wearing the display device, and a display unit for a right eye configured to emit imaging light toward the right eye of the user, and in correspondence to a position of the first display unit visually recognized as an outside scene by the second display unit, a display position by the display unit for a left eye, and a display position by the display unit for a right eye are controlled, and a convergence angle of an image displayed by the second display unit is adjusted.

According to this configuration, the convergence angle of the image displayed by the display device is adjusted, and accordingly, a distance in which the display image of the display device is visually recognized can be made correspond to the position of the first display unit of the electronic device. Accordingly, the display by the display device and the display by the electronic device can be coordinated more appropriately.

Additionally, according to an aspect of the invention, the second display unit includes an optical system capable of adjusting a visual recognition distance that the user perceives to an image displayed by the second display unit, and the optical system is controlled in correspondence to a convergence angle of an image displayed by the second display unit.

According to this configuration, since a distance in which the display image of the display device is visually recognized is made correspond to the position of the first display unit of the electronic device, the display by the display device and the display by the electronic device can be coordinated more appropriately.

Additionally, to address the above-described issue, an electronic device according to an aspect of the invention is an electronic device connected with a display device having a head mounted type and configured to superimpose an image on an outside scene and to display the image, the electronic device including a first display unit, an output unit configured to output an image to the display device, and a control unit configured to, based on a relative position of the first display unit with respect to a second display unit provided in the display device, cause the output unit to output an image used when the second display unit displays an image corresponding to a position of the first display unit visually recognized as an outside scene by the display device.

According to this configuration, the electronic device connected with the display device outputs the image to the display device, and accordingly, the display device can perform display to correspond to the position of the first display unit of the electronic device as the outside scene.

Additionally, to address the above-described issue, a display method according to an aspect of the invention is a display method using an electronic device including a first display unit and a display device having a head mounted type and including a second display unit configured to superimpose an image on an outside scene and to display the image, the display method including outputting an image by the display device, and performing by the display device acquiring the image output by the electronic device, causing the second display unit to display the acquired image, and causing the second display unit to display the image in correspondence to a position of the electronic device visually recognized as an outside scene in the second display unit.

According to an aspect of the invention, when the image output by the electronic device is displayed by the display device, the image is displayed to correspond to the position of the electronic device as the outside scene. For example, since an image can be displayed by the display device in correspondence to the position of the electronic device visible as the outside scene, display corresponding to the display by the electronic device can be performed by the display device.

The aspects of the invention can also be achieved in various modes other than the display system, the electronic device, and the display method described above. For example, the aspects of the invention can be achieved in modes such as a program for executing the above-described display method by a computer, a recording medium storing the program, a server device configured to deliver the program, a transmission medium for transmitting the program, and a data signal in which the program is embodied on a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Exemplary Embodiment 1-1. Configuration of Display System

Figure 1:
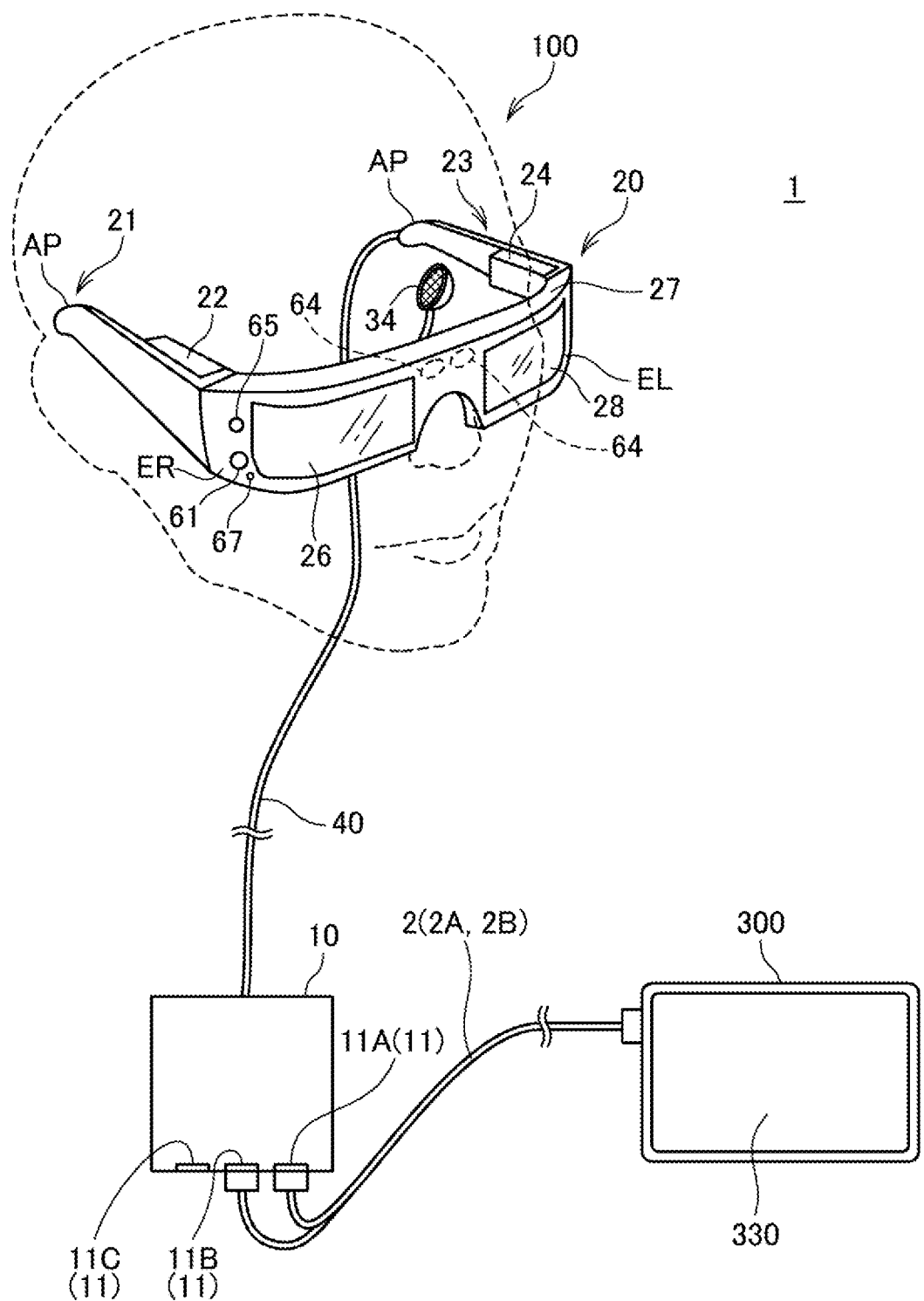
FIG. 1 is an appearance view of an HMD and a PC constituting a display system.

FIG. 1 is a view illustrating a configuration of a display system 1 according to a first exemplary embodiment to which the invention is applied.

The display system 1 includes a Head Mounted Display (HMD: head mounted type display device) 100, and a Personal Computer (PC) 300 as an external device of the HMD 100.

The HMD 100 is a display device including an image display unit 20 (second display unit) configured to cause a user to visually recognize a virtual image in a state where the display device is worn on a head of the user, and a connecting device 10 configured to control the image display unit 20. The connecting device 10 includes a plurality of connectors 11 on a box-shaped case (may be referred to as a housing, or a body). The image display unit 20 and the connecting device 10 are connected via a connecting cable 40.

In an example in FIG. 1, the connecting device 10 includes three connectors 11A, 11B, and 11C. In the following description, when the connectors 11A, 11B, and 11C are not distinguished from one another, the connectors 11A, 11B, and 11C are collectively referred to as a connector 11. The connector 11 is a wired interface to be connected with a communication cable, and via the communication cable, the connecting device 10 is connected with an external device. Each of the connectors 11A, 11B, and 11C is, for example, a connector compliant with a known communication interface standard, and may be a connector having an identical shape, or may be a different type of connector. In the exemplary embodiment, as an example, the connector 11A is a connector compliant with an HDMI (trade name) (High Definition Multimedia Interface) standard. Additionally, the connector 11B is a Universal Serial Bus (USB) Type-C connector. Additionally, the connector 11C is a MicroUSB connector.

In the example in FIG. 1, the connecting device 10 and the PC 300 are connected via a cable 2. The cable 2 includes an HDMI cable 2A connecting the PC 300 and the connector 11A, and a USB cable 2B connecting the PC 300 and the connector 11B. In this example, the PC 300 is connected with the connecting device 10 via an HDMI interface for image transmission, and a USB interface for data communication.

The PC 300 is a computer including a display unit 330 configured to display an image, and corresponds to the electronic device of the invention. The PC 300 is preferably a portable computer, and examples of the PC 300 include a tablet type computer, a note type computer, and a smartphone. The PC 300 in FIG. 1 includes the display unit 330 as the first display unit on a surface of a plate shaped body. The display unit 330 includes a display panel 331 (FIG. 5) such as a liquid crystal display panel, and an organic Electro Luminescent (EL) display panel, and a touch sensor 332 (FIG. 5) configured to detect a touch operation by a user is provided on a surface of the display panel 331.

The PC 300 is configured to function as external equipment with respect to the HMD 100. The external equipment may be any electronic device as long as the electronic device includes a display screen and has a function to display an image on the display screen, and the PC 300 is merely described as an example in the exemplary embodiment.

The image display unit 20 is a mounted body to be worn on a head of a user and is a so-called head mounted type display (HMD). That is, the HMD 100 includes a configuration where the connecting device 10 to be connected to an external device such as the PC 300 is connected with the image display unit 20 as an HMD body. The image display unit 20 has an eyeglasses-like shape in the exemplary embodiment. The image display unit 20 includes, in a body including a right holding part 21, a left holding part 23, and a front frame 27, a right display unit 22 (display unit for a right eye), a left display unit 24 (display unit for a left eye), a right light-guiding plate 26, and a left light-guiding plate 28.

The right holding part 21 and the left holding part 23 extend rearward from both ends of the front frame 27, respectively, and hold the image display unit 20 to a head of a user in a manner similar to temples of a pair of eyeglasses. Here, one of both the ends of the front frame 27 located on the right side of the user in a state where the user wears the image display unit 20 is referred to as an end ER, and the other end located on the left side of the user in a state where the user wears the image display unit 20 is referred to as an end EL. The right holding part 21 extends from the end ER of the front frame 27 to a position corresponding to the right side of the head of the user in a state where the user wears the image display unit 20. The left holding part 23 extends from the end EL to a position corresponding to the left side of the head of the user in a state where the user wears the image display unit 20.

The right light-guiding plate 26 and the left light-guiding plate 28 are provided on the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20. The front frame 27 may include a nose pad provided in the coupling position of the right light-guiding plate 26 and the left light-guiding plate 28, and configured to abut on a nose of the user in a state where the user wears the image display unit 20. In this case, the image display unit 20 can be held to the head of the user by the nose pad, the right holding part 21, and the left holding part 23. Additionally, a belt (not illustrated) configured to be in contact with to a back of the head of the user in a state where the user wears the image display unit 20 may be coupled to the right holding part 21 and the left holding part 23, and in this case, the image display unit 20 can be held to the head of the user by the belt.

Each of the right display unit 22 and the left display unit 24 is a module obtained by unitizing an optical unit and a peripheral circuit.

The right display unit 22 is a unit related to image display by the right light-guiding plate 26, and is provided on the right holding part 21, and located near the right side of the head of the user in a state where the user wears the image display unit 20. The left display unit 24 is a unit related to image display by the left light-guiding plate 28, and is provided on the left holding part 23, and located near the left side of the head of the user in a state where the user wears the image display unit 20. Note that the right display unit 22 and the left display unit 24 are also collectively and simply referred to as a "display driving unit".

The right light-guiding plate 26 and the left light-guiding plate 28 are optical parts formed with a light transmissive resin or the like, and are configured to guide imaging light output by the right display unit 22 and the left display unit 24 to the eyes of the user. The right light-guiding plate 26 and the left light-guiding plate 28 are, for example, prisms.

A dimmer plate (not illustrated) may be provided on each of surfaces of the right light-guiding plate 26 and the left light-guiding plate 28. The dimmer plate is an optical element having a thin plate shape and a transmittance different according to a the wavelength range of light, and functions as a so-called wavelength filter. The dimmer plate is, for example, disposed to cover a front side of the front frame 27 being an opposite side to a side of the eyes of the user. An optical property of this dimmer plate can be selected appropriately to adjust a transmittance of light in any wavelength range such as visible light, infrared light, and ultraviolet light, and to adjust a light amount of outside light entering the right light-guiding plate 26 and the left light-guiding plate 28 from an outside and passing through the right light-guiding plate 26 and the left light-guiding plate 28.

The image display unit 20 is configured to guide imaging light generated by the right display unit 22 and the left display unit 24 to the right light-guiding plate 26 and the left light-guiding plate 28, respectively, and to use this imaging light to cause the user to visually recognize a virtual image to display an image. When outside light passes through the right light-guiding plate 26 and the left light-guiding plate 28 and enters the eyes of the user from in front of the user, imaging light constituting the virtual image and the outside light enter the eyes of the user, and visibility of the virtual image is affected by intensity of the outside light. Thus, for example, the dimmer plate can be mounted on the front frame 27, and the optical property of the dimmer plate can be selected or adjusted appropriately to adjust easiness of visual recognition of the virtual image. In a typical example, the dimmer plate having a light transmittance to an extent that the user wearing the HMD 100 can visually recognize at least an external scene can be used. Additionally, when the dimmer plate is used, an effect such as protecting the right light-guiding plate 26 and the left light-guiding plate 28 to suppress a damage, adhesion of dust or the like on the right light-guiding plate 26 and the left light-guiding plate 28 can be expected. The dimmer plate may be provided detachably on the front frame 27 or each of the right light-guiding plate 26 and the left light-guiding plate 28, or a plurality of types of dimmer plates may be replaceably mounted, or the dimmer plate may be omitted.

Each of the right display unit 22 and the left display unit 24 of the image display unit 20 is connected with the connecting device 10. In the HMD 100, the connecting cable 40 is connected with the left holding part 23, and wiring connected with this connecting cable 40 is laid inside the image display unit 20 to connect each of the right display unit 22 and the left display unit 24 with the connecting device 10.

A camera 61 is disposed on the front frame 27 of the image display unit 20. The camera 61 desirably captures an image in an outside scene direction in which the user visually recognize an outside scene in a state where the user wears the image display unit 20, and the camera 61 is provided at a position on a front face of the front frame 27 where the camera 61 does not block the outside light passing through the right light-guiding plate 26 and the left light-guiding plate 28. In the example in FIG. 1, the camera 61 is disposed on the end ER side of the front frame 27. The camera 61 may be disposed on the end EL side or may be disposed at the coupling of the right light-guiding plate 26 and the left light-guiding plate 28.

The camera 61 is a digital camera including an imaging element such as a CCD and a CMOS, an imaging lens and the like, and the camera 61 according to the exemplary embodiment is a monocular camera, but may include a stereo camera. The camera 61 is configured to capture an image of at least a portion of an outside scene in a front side direction of the HMD 100, in other words, in a direction of a field of view of the user in a state where the user wears the HMD 100. The outside scene can be rephrased as a real space.

In other words, the camera 61 is configured to capture an image in the range or a direction superimposed on the field of view of the user, and is configured to capture an image in a direction in which the user fixates. A width of an angle of view of the camera 61 can be set appropriately, but in the exemplary embodiment, as described later, the width of an angle of view of the camera 61 includes an outside world the user visually recognizes through the right light-guiding plate 26 and the left light-guiding plate 28. More preferably, the imaging range of the camera 61 is set to enable capturing all the field of view of the user that can be recognized visually through the right light-guiding plate 26 and the left light-guiding plate 28.

The HMD 100 includes a distance sensor 64. The distance sensor 64 is disposed on a border portion of the right light-guiding plate 26 and the left light-guiding plate 28. In a state where the user wears the image display unit 20, a position of the distance sensor 64 is nearly in the middle of both the eyes of the user in a horizontal direction, and is above both the eyes of the user in a vertical direction.

The distance sensor 64 is configured to detect a distance to an object to be measured and located in a preset measurement direction. The measurement direction of the distance sensor 64 in the exemplary embodiment is the front side direction of the HMD 100 and overlaps with an imaging direction of the camera 61.

Figure 2:
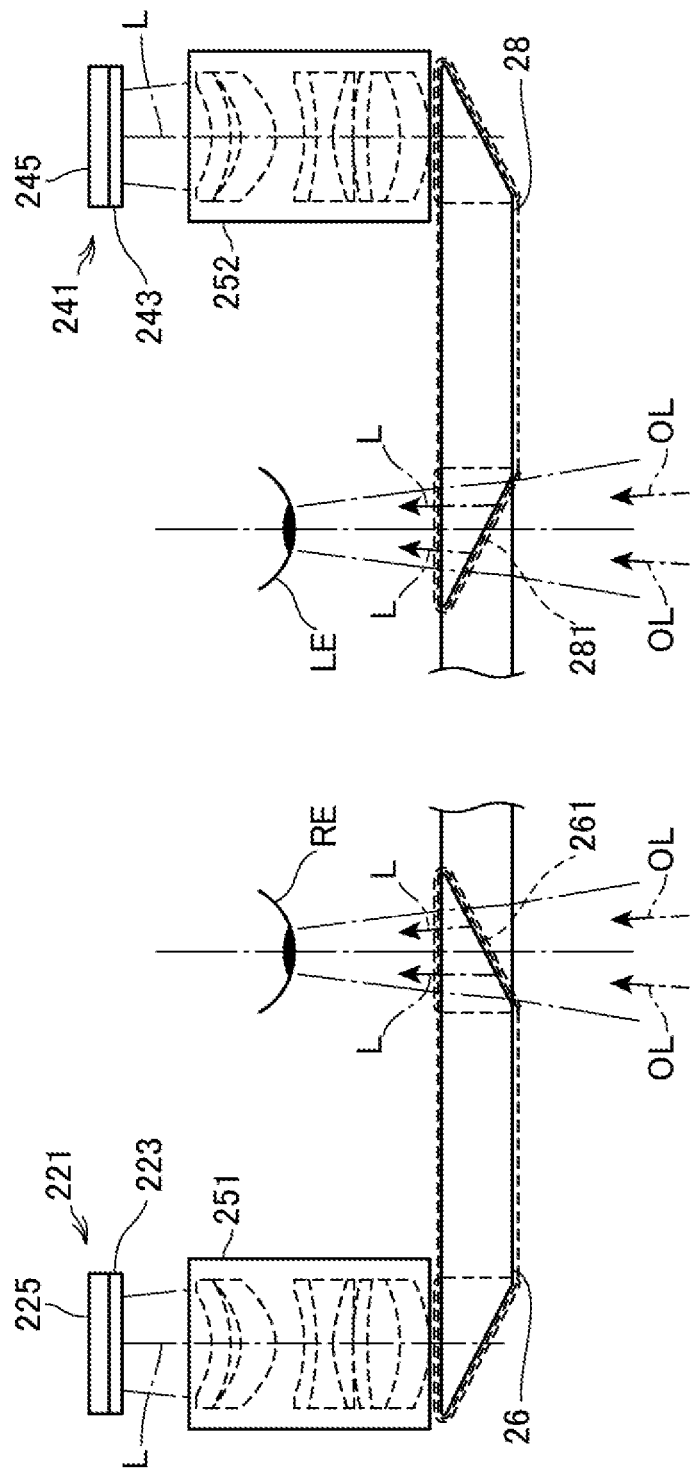
FIG. 2 is a view illustrating a configuration of an optical system of the HMD.

FIG. 2 is a plan view of a main portion illustrating a configuration of an optical system of the HMD 100. In FIG. 2, a left eye LE and a right eye RE of a user are illustrated for explanation.

As illustrated in FIG. 2, the right display unit 22 and the left display unit 24 are disposed symmetrically on the right- and left-hand sides. As a configuration where the right eye RE of the user is caused to visually recognize an image, the right display unit 22 includes an Organic Light-Emitting Diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED drive circuit 225 configured to drive the OLED panel 223. The OLED panel 223 is a self-light emission type display panel including light-emitting elements disposed in a matrix and configured to emit light by organic electroluminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix.

The OLED drive circuit 225 is configured to, based on image data input from the connecting device 10, select and power the light-emitting elements provided in the OLED panel 223 to cause the light-emitting elements of the OLED panel 223 to emit light. The OLED drive circuit 225 is fixed by bonding or the like to a rear face of the OLED panel 223, namely, a back side of a light-emitting surface of the OLED panel 223. The OLED drive circuit 225 may include, for example, a semiconductor device configured to drive the OLED panel 223, and may be mounted on a substrate (not illustrated) fixed to the rear face of the OLED panel 223. A temperature sensor 217 is mounted on this substrate.

Note that the OLED panel 223 may include a configuration in which light-emitting elements configured to emit white color light are disposed in a matrix, and color filters corresponding to the R color, the G color, and the B color respectively are disposed to be superimposed on the light-emitting elements. Additionally, the OLED panel 223 of a WRGB configuration including light-emitting elements configured to emit white (W) color light, in addition to the light-emitting elements configured to emit the R color light, the G color light, and the B color light respectively may be used.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image on a retina of the right eye RE, and causes the user to visually recognize the image.

Additionally, as a configuration in which the left eye LE of the user is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED drive circuit 245 configured to drive the OLED panel 243. The OLED panel 243 is a self-light emission type display panel configured in a manner similar to the OLED panel 223. The OLED drive circuit 245 is configured to, based on image data input from the connecting device 10, select and power light-emitting elements provided in the OLED panel 243 to cause the light-emitting elements of the OLED panel 243 to emit light. The OLED drive circuit 245 is fixed by bonding or the like to a rear face of the OLED panel 243, namely, a back side of a light-emitting surface of the OLED panel 243. The OLED drive circuit 245 may include, for example, a semiconductor device configured to drive the OLED panel 243, and may be mounted on a substrate (not illustrated) fixed to the rear face of the OLED panel 243. A temperature sensor 239 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L is formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina of the left eye LE, and causes the user to visually recognize the image.

The HMD 100 functions as a see-through type display device. Namely, the imaging light L reflected by the half mirror 261 and outside light OL having passed through the right light-guiding plate 26 enter the right eye RE of the user. Additionally, the imaging light L reflected by the half mirror 281 and the outside light OL having passed through the half mirror 281 enter the left eye LE. Accordingly, the HMD 100 superimposes the imaging light L of an image processed internally and the outside light OL on each other, and causes the imaging light L and the outside light OL superimposed on each other to enter the eyes of the user, and the user views an outside scene through the right light-guiding plate 26 and the left light-guiding plate 28, and visually recognizes the image formed by the imaging light L and superimposed on this outside scene. Each of the half mirrors 261 and 281 is an image extracting unit configured to reflect imaging light output by each of the right display unit 22 and the left display unit 24 and extract an image, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user. For example, a diffraction grating may be used, or a semi-transmissive reflection film may be used.

Figure 3:
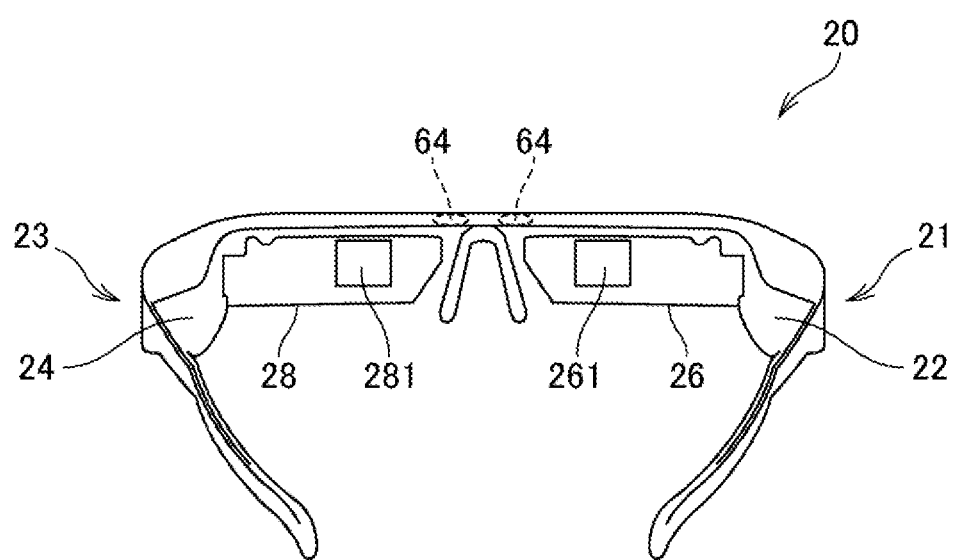
FIG. 3 is a perspective view of a main portion of an image display unit as viewed from a head side of a user.

FIG. 3 is a perspective view of a main portion of the image display unit 20 as viewed from the head side of the user, this is, a side being in contact with the head of the user of the image display unit 20, in other words, a side visible with the right eye RE and the left eye LE of the user. In other words, back sides of the right light-guiding plate 26 and the left light-guiding plate 28 are visible.

In FIG. 3, the half mirror 261 configured to irradiate the right eye RE of the user with imaging light and the half mirror 281 configured to irradiate the left eye LE with imaging light are visible as approximately square-shaped regions. Additionally, all the right light-guiding plate 26 and the left light-guiding plate 28 including the half mirrors 261 and 281 transmit the outside light as described above. Thus, the user visually recognizes an outside scene through all the right light-guiding plate 26 and the left light-guiding plate 28, and visually recognizes rectangular display images at positions of the half mirrors 261 and 281.

Figure 4:
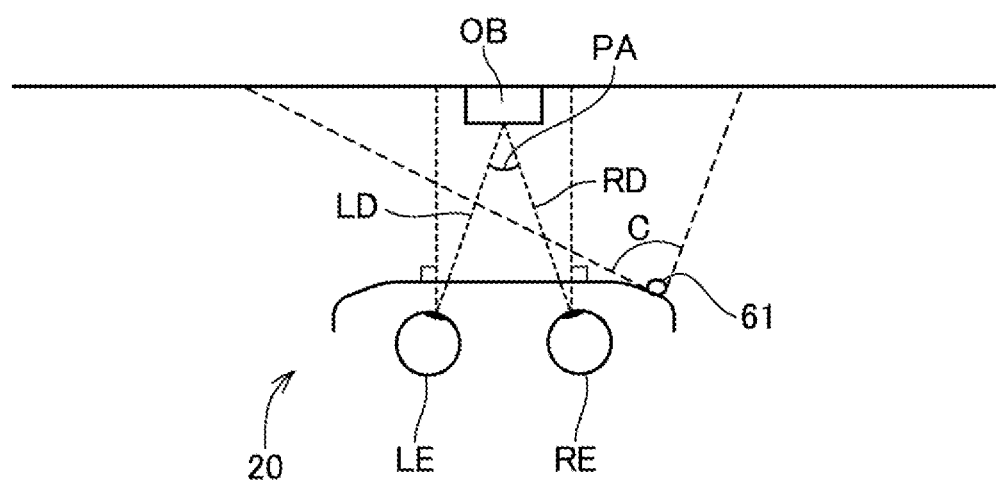
FIG. 4 is an explanatory view illustrating correspondence between a display unit of the HMD and the imaging range.

FIG. 4 is an explanatory view illustrating correspondence between the image display unit 20 of the HMD 100 and the imaging range.

As described above, the camera 61 is disposed at the end on the right side in the image display unit 20, and captures an image in a direction in which both the eyes of the user are directed, namely, in front of the user.

FIG. 4 is a view schematically illustrating a position of the camera 61 together with the right eye RE and the left eye LE of the user in a plan view. An angle of view (imaging range) C of the camera 61 is illustrated. Note that the angle of view C in a horizontal direction is illustrated in FIG. 4, but an actual angle of view of the camera 61 also extends in a top-bottom direction as in a manner similar to a general digital camera.

An optical axis of the camera 61 extends in a direction including a line of sight direction RD of the right eye RE and a line of sight direction LD of the left eye LE. The outside scene that can be recognized visually by the user in a state where the user wears the HMD 100 is not necessarily an infinitely distant scene. For example, as illustrated in FIG. 4, when the user fixates an object OB with both the eyes, the lines of sight RD and LD of the user are directed to the object OB. In this case, a distance from the user to the object OB often ranges from approximately 30 cm to 10 m, and more often ranges from approximately 1 m to 4 m. Thus, standards of an upper limit and a lower limit of the distance from the user to the object OB in normal use may be defined for the HMD 100. These standards may be determined by research or an experiment, or may be set by the user. The optical axis and the angle of view of the camera 61 may preferably be set such that when the distance to the object OB in normal use corresponds to the set standard of the upper limit, and when the distance to the object OB in normal use corresponds to the set standard of the lower limit, this object OB is present within the angle of view.

Additionally, in general, a visual field angle of a human is approximately 200 degrees in the horizontal direction and approximately 125 degrees in the vertical direction, and an effective field of view excellent in information acceptance performance of the visual field angle of a human is approximately 30 degrees in the horizontal direction and approximately 20 degrees in the vertical direction. Further, a stable field of fixation in which a point of fixation at which a human fixates is promptly and stably visible ranges from approximately 60 degrees to 90 degrees in the horizontal direction, and ranges from approximately 45 degrees to 70 degrees in the vertical direction. In this case, when the point of fixation is located at the object OB in FIG. 4, the effective field of view is approximately 30 degrees in the horizontal direction and approximately 20 degrees in the vertical direction with the lines of sight RD and LD as the center. Additionally, the stable field of fixation ranges from approximately 60 degrees to 90 degrees in the horizontal direction and from approximately 45 degrees to 70 degrees in the vertical direction, and a visual field angle is approximately 200 degrees in the horizontal direction, and approximately 125 degrees in the vertical direction. Further, an actual visual field in which the user visually recognizes through the image display unit 20, and through the right light-guiding plate 26, and the left light-guiding plate 28 can be referred to as an actual Field Of View (FOV). In the configuration of the exemplary embodiment illustrated in each of FIG. 1 and FIG. 2, the actual field of view corresponds to an actual visual field in which the user visually recognizes through the right light-guiding plate 26 and the left light-guiding plate 28. The actual field of view is narrower than the visual field angle and the stable field of fixation, but wider than the effective field of view.

The angle of view C of the camera 61 can preferably capture an image in the range wider than the visual field of the user, and specifically, the angle of view C is preferably wider than at least the effective field of view of the user. Additionally, the angle of view C is more preferably wider than the actual field of view of the user. Further preferably, the angle of view C is wider than the stable field of fixation of the user, and most preferably, the angle of view C is wider than the visual field angles of both the eyes of the user.

The camera 61 may include a so-called wide angle lens as an imaging lens and may be configured to be capable of capturing an image at a wide angle of view. The wide angle lens may include lenses referred to as an ultrawide lens and a quasi wide lens, or may be a single focus lens or a zoom lens, or the camera 61 may be configured to include a lens group including a plurality of lenses.

Additionally, as described above, the camera 61 in the exemplary embodiment is disposed on the end ER side in the front frame 27 of the image display unit 20, but may be disposed on the end EL side, or may be disposed at the coupling of the right light-guiding plate 26 and the left light-guiding plate 28. In this case, a position in a right-left direction of the camera 61 is different from the position in FIG. 4, and the angle of view C is appropriately set according to the position of the camera 61.

Specifically, when the camera 61 is on the end EL side, the angle of view C is directed diagonally forward right in FIG. 4. Additionally, for example, when the camera 61 is disposed at the coupling of the right light-guiding plate 26 and the left light-guiding plate 28, the angle of view C is directed toward a front side of the image display unit 20.

When the user views an object with the right eye RE and the left eye LE, the user perceives and recognizes a distance to the object according to an angle formed by the line of sight direction of the right eye RE and the line of sight direction of the left eye LE. This angle is referred to as a convergence angle, and a convergence angle made when the object OB illustrated in FIG. 4 is viewed is PA, for example.

A convergence angle made when the user views images displayed on the half mirrors 261 and 281 is an angle formed by a line of sight direction made when the image on the half mirror 261 is viewed with the right eye RE and a line of sight direction made when the image on the half mirror 281 is viewed with the left eye LE. A degree of the convergence angle in this case is determined by display positions of images on the half mirrors 261 and 281. Therefore, a display position at which the right display unit 22 displays an image and a display position at which the left display unit 24 displays an image are adjusted, and accordingly, the convergence angle can be controlled to control a sense of distance visually recognized by the user. For example, with respect to the images displayed by the right display unit 22 and the left display unit 24, the sense of distance visually recognized by the user (visual recognition distance) can be adjusted.

Additionally, the distance sensor 64 is disposed to be directed forward in the middle of the right light-guiding plate 26 and the left light-guiding plate 28.

1-2. Control System of Display System

Figure 5:
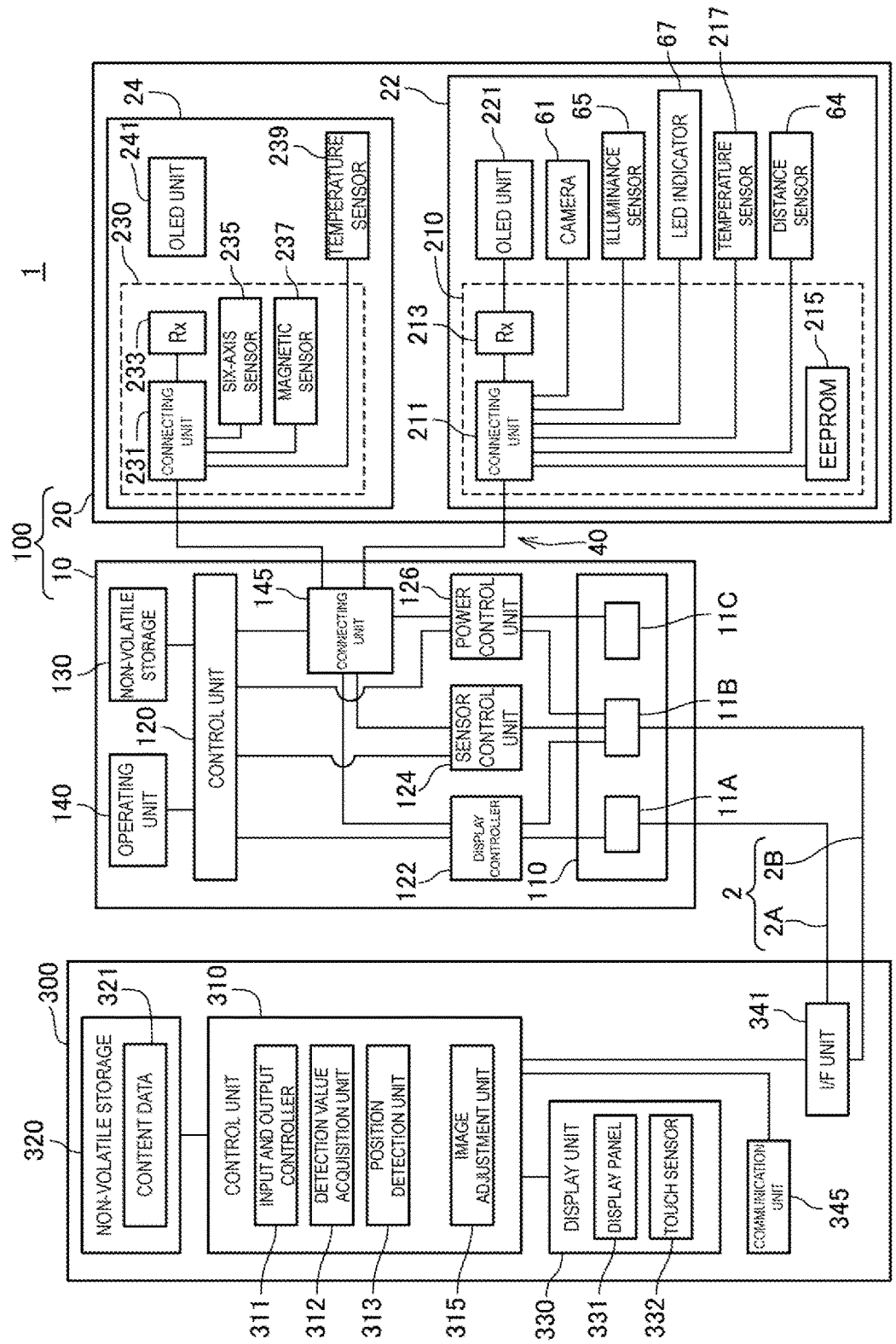
FIG. 5 is a block diagram of respective components constituting the display system.

FIG. 5 is a block diagram illustrating configurations of the HMD 100 and the PC 300 constituting the display system 1.

As described above, the HMD 100 includes the connecting device 10 and the image display unit 20 connected with each other via the connecting cable 40.

As described above, the image display unit 20 includes the right display unit 22 and the left display unit 24. The right display unit 22 includes a display unit substrate 210. On the display unit substrate 210, a connecting unit 211 configured to be connected with the connecting cable 40, a reception unit (Rx) 213 configured to receive data input from the connecting device 10 via the connecting unit 211, and an EEPROM 215 (storage unit) are mounted.

The connecting unit 211 connects the reception unit 213, the EEPROM 215, the temperature sensor 217, the camera 61, the distance sensor 64, an illuminance sensor 65, and an LED indicator 67 with the connecting device 10.

The Electrically Erasable Programmable Read-Only Memory (EEPROM) 215 stores various kinds of data in a non-volatile manner. The EEPROM 215 stores, for example, data about light-emitting properties and display properties of the OLED units 221 and 241 provided in the image display unit 20, and data about a property of a sensor provided in the right display unit 22 or the left display unit 24. Specifically, the EEPROM 215 stores parameters regarding gamma correction of the OLED units 221 and 241, data used to compensate for detection values of the temperature sensors 217 and 239, and the like. These kinds of data are generated by inspection at the time of shipping of the HMD 100 from a factory, and are written into the EEPROM 215. The data stored in the EEPROM 215 can be read by a control unit 120.

The camera 61 captures an image in accordance with a signal input via the connecting unit 211 and outputs captured image data to the connecting unit 211.

As illustrated in FIG. 1, the illuminance sensor 65 is provided at the end ER of the front frame 27 and is disposed to receive outside light coming from in front of the user wearing the image display unit 20. The illuminance sensor 65 is configured to output a detection value corresponding to an amount of received light (intensity of received light).

As illustrated in FIG. 1, the LED indicator 67 is disposed near the camera 61 at the end ER of the front frame 27. The LED indicator 67 is configured to be turned on during image capturing by the camera 61 to notify that the image capturing is in progress.

The temperature sensor 217 is configured to detect a temperature and output a voltage value or a resistance value corresponding to the detected temperature as a detection value. The temperature sensor 217 is mounted on the rear face side of the OLED panel 223 (FIG. 3). The temperature sensor 217 may be mounted, for example, on the same substrate as the substrate on which the OLED drive circuit 225 is mounted. According to this configuration, the temperature sensor 217 mainly detects a temperature of the OLED panel 223.

The distance sensor 64 is configured to execute distance detection, and output a signal indicating detection results to the connecting device 10 via the connecting unit 211. As the distance sensor 64, for example, an infrared ray type depth sensor, an ultrasonic type distance sensor, Time Of Flight (TOF) type distance sensor, and a distance detection unit configured to perform image detection and audio detection in combination can be used. Additionally, the distance sensor 64 may be configured to process an image obtained in stereo photographing by a stereo camera or a monocular camera to detect a distance.

In FIG. 5, the single distance sensor 64 is illustrated, but a pair of the distance sensors 64 and 64 illustrated in FIG. 3 may operate simultaneously. Additionally, each of the pair of distance sensors 64 and 64 may be connected with the connecting unit 211 and operate independently of each other.

The reception unit 213 is configured to receive image data for displaying transmitted from the connecting device 10 via the connecting unit 211, and output the image data to the OLED unit 221.

The left display unit 24 includes the display unit substrate 210. On the display unit substrate 210, a connecting unit 231 configured to be connected with the connecting cable 40, and a reception unit (Rx) 233 configured to receive data input from the connecting device 10 via the connecting unit 231 are mounted. Additionally, on the display unit substrate 210, a six-axis sensor 235 and a magnetic sensor 237 are mounted.

The connecting unit 231 connects the reception unit 233, the six-axis sensor 235, the magnetic sensor 237, and the temperature sensor 239 with the connecting device 10.

The six-axis sensor 235 is a motion sensor (inertial sensor) including a three-axis acceleration sensor and a three-axis gyro (angular velocity) sensor. As the six-axis sensor 235, an Inertial Measurement Unit (IMU) including the above-described sensors as modules may be adopted. The magnetic sensor 237 is a three-axis geomagnetic sensor, for example.

The temperature sensor 239 is configured to detect a temperature and output a voltage value or a resistance value corresponding to the detected temperature as a detection value. The temperature sensor 239 is mounted on the rear face side of the OLED panel 243 (FIG. 3). The temperature sensor 239 may be mounted, for example, on the same substrate as the substrate on which the OLED drive circuit 245 is mounted. According to this configuration, the temperature sensor 239 mainly detects a temperature of the OLED panel 243.

Additionally, the temperature sensor 239 may be built in the OLED panel 243 or the OLED drive circuit 245. Additionally, the substrate may be a semiconductor substrate. Specifically, when the OLED panel 243 is mounted, as an Si-OLED, together with the OLED drive circuit 245 and the like to form an integrated circuit on an integrated semiconductor chip, the temperature sensor 239 may be mounted on this semiconductor chip.

Each component of the image display unit 20 operates with power supplied from the connecting device 10 via the connecting cable 40. The image display unit 20 may include a power circuit (not illustrated) configured to perform voltage conversion or distribution of the power supplied via the connecting cable 40.

The connecting device 10 includes an I/F (interface) unit 110, the control unit 120, a display controller 122, a sensor control unit 124, a power control unit 126, a non-volatile storage 130, an operating unit 140, and a connecting unit 145. The I/F unit 110 as an acquisition unit includes the connectors 11A, 11B, and 11C. Additionally, the I/F unit 110 may include interface circuits (not illustrated) connected with the connectors 11A, 11B, and 11C and configured to execute communication protocols compliant with respective communication standards. Additionally, the I/F unit 110 may be configured to receive power supply via the connectors 11A, 11B, and 11C.

The I/F unit 110, for example, may include an interface for a memory card capable of being connected with an external storage device or storage medium, or the like, or the I/F unit 110 may include a radio communication interface. The I/F unit 110 may be, for example, an interface substrate on which the connectors 11A, 11B, and 11C, and an interface circuit are mounted. Additionally, a configuration in which the control unit 120, the display controller 122, the sensor control unit 124, and the power control unit 126 of the connecting device 10 are mounted on a connecting device main substrate (not illustrated) may be adopted. In this case, on the connecting device main substrate, the connectors 11A, 11B, and 11C of the I/F unit 110, and an interface circuit may be mounted.

The control unit 120 is configured to control each component of the connecting device 10. The control unit 120 includes a processor (not illustrated) such as a Central Processing Unit (CPU), and a microcomputer. The control unit 120 causes the processor to execute a program to control each component of the HMD 100 in cooperation of software and hardware. Additionally, the control unit 120 may include programmed hardware. The control unit 120 may include, together with the processor, a Random Access Memory (RAM) configured to form a work area and a Read Only Memory (ROM) configured to store a control program. Additionally, the control unit 120 may be a semiconductor device including a processor, a RAM, and a ROM integrated.

The control unit 120 is connected with the non-volatile storage 130, the operating unit 140, and the connecting unit 145.

The display controller 122 is configured to execute various kinds of processing for the image display unit 20 to display an image based on image data input to the I/F unit 110. For example, the display controller 122 is configured to execute various kinds of processing such as cutting out of a frame, resolution conversion (scaling), intermediate frame generation, and frame rate conversion. The display controller 122 is configured to output image data corresponding to each of the OLED unit 221 of the right display unit 22, and the OLED unit 241 of the left display unit 24 to the connecting unit 145. The image data input to the connecting unit 145 is transmitted to the connecting units 211 and 231 via the connecting cable 40.

As a specific example of the "cutting out" of a frame, the display controller 122 lays out an entire image larger than a size of a display area in which the image display unit 20 displays an image, on an work area. The display area is, for example, an area in which an image is formed in each of the OLED units 221 and 241. Additionally, a size of an image is indicated by the number of pixels, or resolution. The display controller 122 transfers only data of the cut out area of the laid out image to the right display unit 22 and the left display unit 24.

Additionally, the display controller 122 may be configured to acquire image data larger than the display area of the image display unit 20, generate image data including only image data extracted from the acquired image data and having a size to be displayed by the image display unit 20, and transfer the generated image data to the right display unit 22 and the left display unit 24.

For example, when the image data input to the I/F unit 110 is 3D (three dimensional) image data, the display controller 122 is configured to execute 3D image decode. In processing of the 3D image decode, the display controller 122 is configured to generate a frame for the right eye and a frame for the left eye from the 3D image data. Examples of a format of the 3D image data input to the I/F unit 110 include a side by side format, a top and bottom format, and a frame packing format, but 3D model data may be used.

The display controller 122 is connected with the connector 11A and the connector 11B provided in the I/F unit 110. The display controller 122 is configured to execute processing on image data input to the connector 11A and image data input to the connector 11B, as an object to be processed. Additionally, the display controller 122 may have a function to transmit/receive various kinds of control data about transmission of image data to/from a device connected with the connector 11A or the connector 11B.

The sensor control unit 124 is configured to control the camera 61, the distance sensor 64, the illuminance sensor 65, the temperature sensor 217, the six-axis sensor 235, the magnetic sensor 237, and the temperature sensor 239. Specifically, the sensor control unit 124 is configured to set and initialize a sampling period of each sensor according to control by the control unit 120, and the sensor control unit 124 is configured to, in correspondence to the sampling period of each sensor, power each sensor, transmit control data, and acquire a detection value, for example.

Additionally, the sensor control unit 124 is connected with the connector 11B of the I/F unit 110, and is configured to output data about the detection value acquired from each sensor to the connector 11B at preset timing. Accordingly, a device connected with the connector 11B can acquire the detection value of each sensor of the HMD 100, and captured image data of the camera 61. The data output by the sensor control unit 124 may be digital data including the detection value. Additionally, the sensor control unit 124 may be configured to output data of results obtained by an arithmetic operation based on the detection value of each sensor. For example, the sensor control unit 124 is configured to integrally process detection values of a plurality of sensors, and function as a so-called sensor fusion processing unit. The sensor control unit 124 executes sensor fusion to output data determined from the detection values of the sensors, for example, track data of movement of the image display unit 20, and relative coordinate data of the image display unit 20. The sensor control unit 124 may have a function to transmit/receive various kinds of control data about transmission of data to/from a device connected with the connector 11B.

A processor such as a CPU may execute a program to achieve the display controller 122 and/or the sensor control unit 124 in cooperation of software and hardware. Namely, each of the display controller 122 and the sensor control unit 124 includes a processor, and executes a program to execute the above-described operations. In this example, a processor constituting the control unit 120 may execute a program to achieve the display controller 122 and the sensor control unit 124. In other words, the processor may be configured to execute the program to function as the control unit 120, the display controller 122, and the sensor control unit 124. Here, the processor can be rephrased as a computer.

Additionally, each of the display controller 122 and the sensor control unit 124 may include programmed hardware such as a Digital Signal Processor (DSP) and a Field Programmable Gate Array (FPGA). Additionally, the display controller 122 and the sensor control unit 124 may be integrated to be constituted as a System-on-a-Chip (SoC)-FPGA.

The power control unit 126 is connected with the connector 11B and the connector 11C provided in the I/F unit 110. The power control unit 126 is configured to, based on power supplied from the connectors 11B and 11C, supply power to each component of the connecting device 10 and the image display unit 20. Additionally, the power control unit 126 may include a voltage conversion circuit (not illustrated) built in, and may be configured to be capable of supplying different voltage to each component of the connecting device 10 and the image display unit 20. The power control unit 126 may include a programmed semiconductor device such as a logic circuit and the FPGA. Additionally, the power control unit 126 may include hardware (including a processor) common to the display controller 122 and/or the sensor control unit 124.

Each of the display controller 122, the sensor control unit 124 and the power control unit 126 may include a work memory for performing data processing, and may be configured to perform processing by using a work area of a RAM (not illustrated) provided in the control unit 120.

The control unit 120 is configured to read data from the EEPROM 215 provided in the right display unit 22, and the control unit 120 is configured to, based on the read data, set operations of the display controller 122 and the sensor control unit 124. Additionally, the control unit 120 is configured to, according to an operation in the operating unit 140, cause respective components including the display controller 122, the sensor control unit 124, and the power control unit 126 to operate. Additionally, the control unit 120 is configured to identify devices connected with the display controller 122, the sensor control unit 124, and the power control unit 126 via the I/F unit 110, and control the display controller 122, the sensor control unit 124, and the power control unit 126 to execute operations appropriate for the respective devices.

Additionally, the control unit 120 is configured to control start and stop of powering the LED indicator 67. For example, the control unit 120 turns on or blinks the LED indicator 67 in correspondence to timing at which the camera 61 starts and ends capturing an image.

The non-volatile storage 130 is a storage device configured to store data to be processed by the control unit 120, and the like in a non-volatile manner. The non-volatile storage 130 is, for example, a magnetic recording device such as a Hard Disk Drive (HDD), or is a storage device using a semiconductor storage element such as a flash memory.

Additionally, the connecting device 10 may include a rechargeable battery (not illustrated), and may be configured to supply power to each component of the connecting device 10 and the image display unit 20 from this battery.

The PC 300 includes a control unit 310, a non-volatile storage 320, the display unit 330, an I/F (interface) unit 341, and a communication unit 345. The control unit 310 (electronic device control unit) includes a processor (not illustrated) such as a CPU or a microcomputer, and this processor is configured to execute a program to control each component of the PC 300. The control unit 310 may include a ROM configured to store, in a non-volatile manner, a control program to be executed by the processor (so-called computer), and a RAM constituting a work area of the processor.

The non-volatile storage 320 is configured to store, in a non-volatile manner, a program to be executed by the control unit 310 and data to be processed by the control unit 310. The non-volatile storage 130 is, for example, a magnetic recording device such as an HDD, or is a storage device using a semiconductor storage element such as a flash memory.

The non-volatile storage 320 is configured to store, for example, content data 321 of contents including an image. The content data 321 is a file in a format that the control unit 310 can process, and includes image data, and may include audio data.

Additionally, the non-volatile storage 320 is configured to store an operating system (OS) as a basic control program executed by the control unit 310, an application program operating by using the OS as a platform, and the like. Additionally, the non-volatile storage 320 is configured to store data processed during execution of the application program, data of processing results, and the like.

The display panel 331, and the touch sensor 332 provided in the display unit 330 are connected with the control unit 310. The display panel 331 is configured to display various images based on control of the control unit 310. The touch sensor 332 is configured to detect a touch operation and output data indicating the detected operation to the control unit 310. The data output by the touch sensor 332 is coordinate data indicating an operating position in the touch sensor 332, or the like.

The I/F unit 341 is an interface connected with an external device, and corresponds to the output unit according to the invention. The I/F unit 341 is configured to execute communication compliant with, for example, a standard such as an HDMI interface and a USB interface. The I/F unit 341 includes a connector (not illustrated) to be connected with a cable (for example, the cable 2), and an interface circuit (not illustrated) configured to process a signal transmitted via the connector. The I/F unit 341 is an interface substrate including the connector and the interface circuit, and is connected with a main substrate on which a processor and the like of the control unit 310 are mounted. Alternatively, the connector and the interface circuit constituting the I/F unit 341 are mounted on a main substrate of the PC 300. In the exemplary embodiment, the I/F unit 341 includes the HDMI interface, and the USB interface, and is connected with the connectors 11A and 11B via the HDMI cable 2A and the USB cable 2B, respectively. For example, the control unit 310 is configured to output image data via the HDMI cable 2A, and receive data about an output value of a sensor and the like from the connecting device 10 via the USB cable 2B. The I/F unit 341 can execute communication via the HDMI cable 2A and communication via the USB cable 2B, independently. Additionally, the I/F unit 341 may be a radio communication interface. In this case, the I/F unit 341 can be an interface substrate on which a communication circuit including an RF unit is mounted, or can be a circuit mounted on a main substrate.

The communication unit 345 is a communication interface configured to execute data communication with an external device. The communication unit 345 may be a wired communication interface capable of being connected with a cable, or may be a radio communication interface. For example, the communication unit 345 may be a wired LAN interface supporting Ethernet (trade name), or a wireless LAN interface supporting IEEE802.11 standards.

The control unit 310 is configured to execute the programs as described above to function as an input and output controller 311, a detection value acquisition unit 312, a position detection unit 313, and an image adjustment unit 315.

The input and output controller 311 is configured to, based on data input from the touch sensor 332, detect input by the user. Additionally, the input and output controller 311 is configured to control input and output of data by the I/F unit 341 and the communication unit 345.

The detection value acquisition unit 312 is configured to acquire data about a detection value of each sensor provided in the HMD 100, from the connecting device 10 connected via the I/F unit 341. The detection value acquisition unit 312 is configured to acquire captured image data of the camera 61, and data about detection values of the distance sensor 64, the illuminance sensor 65, the EEPROM 215, the six-axis sensor 235, the magnetic sensor 237, the temperature sensor 239, and the like, from the connecting device 10. The data acquired by the detection value acquisition unit 312 is data processed by the sensor control unit 124, and may be data including the detection value of each sensor, or data statistically processed by the sensor control unit 124.

The position detection unit 313 is configured to, based on the data acquired by the detection value acquisition unit 312, detect a position of the HMD 100. More specifically, the position detection unit 313 is configured to detect a relative position between the PC 300 and the image display unit 20. Here, the relative position detected by the position detection unit 313 may be a position in a space in which the image display unit 20 and the PC 300 exist, or may include a relative direction between the image display unit 20 and the display unit 330. For example, the relative position detected by the position detection unit 313 may be information indicating the position and/or the direction of the display unit 330 with respect to the image display unit 20. Additionally, for example, the relative position detected by the position detection unit 313 may be information indicating the position and/or the direction of the image display unit 20 with respect to the PC 300. Additionally, for example, the relative position detected by the position detection unit 313 may include coordinates in a three dimensional coordinate system set in the space in which the image display unit 20 and the PC 300 exist.

The position detection by the position detection unit 313 will be described later.

The image data PC 300 outputs to the connecting device 10 can include, in addition to image data obtained by playing the content data 321, image data in a screen the PC 300 causes the display unit 330 to display. In this case, the connecting device 10 is configured to display an identical screen to a screen the display unit 330 display, and perform so-called mirroring display.

Additionally, the image adjustment unit 315 may be configured to cause the display unit 330 to display a larger image including an image the connecting device 10 is displaying and an image not displayed by the PC 300. Additionally, for example, the connecting device 10 may be configured to expand and display a portion of the image the PC 300 displays. A display mode in the PC 300 will be described later.

1-3. Operation of Display System

Figure 6:
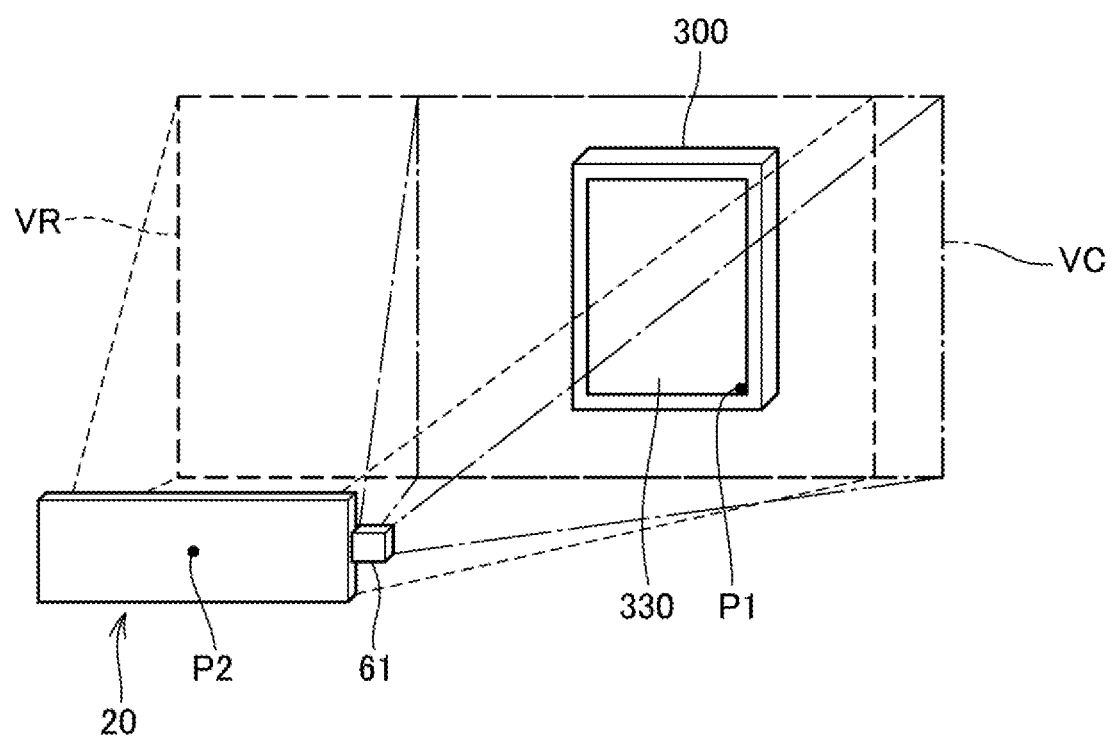
FIG. 6 is an explanatory view illustrating processing for determining a relative position of the PC with respect to the image display unit.
Figure 7:
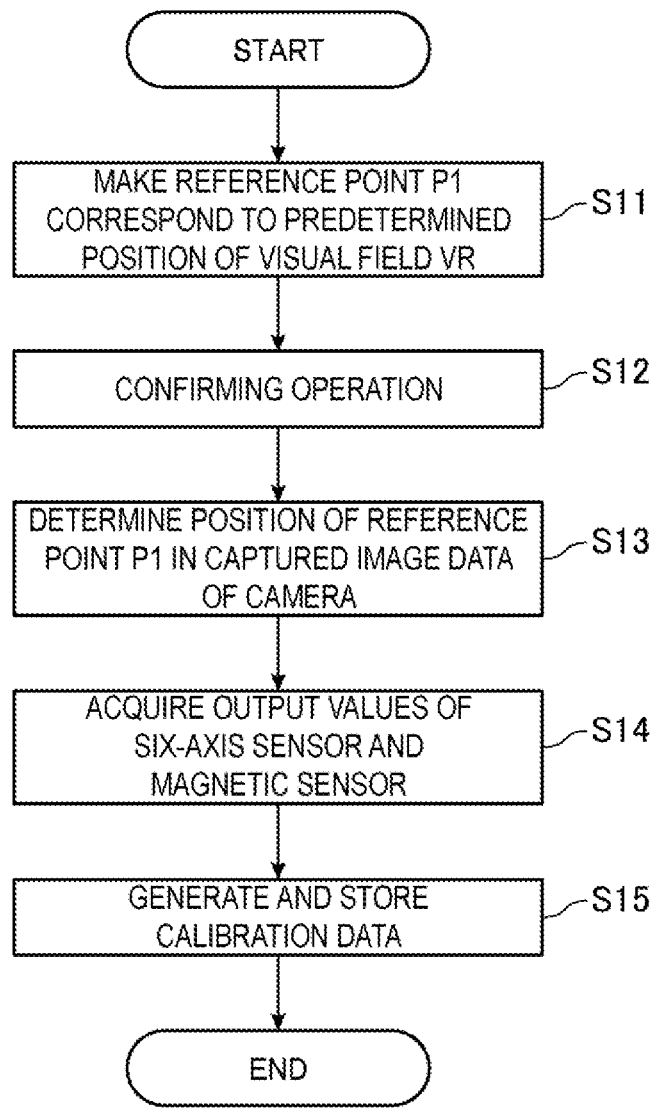
FIG. 7 is a flowchart illustrating an operation of the display system.

FIG. 6 is an explanatory view illustrating processing for determining the relative position of the PC 300 with respect to the image display unit 20, and particularly illustrates calibration processing. FIG. 7 is a flowchart illustrating an operation of the display system 1, and particularly illustrates an operation of the PC 300 in the calibration processing.

In FIG. 6, a visual field VR a user visually recognizes through the image display unit 20, and an imaging range VC of the camera 61 are illustrated. In this example, the imaging range VC overlaps with the visual field VR but does not coincide with the visual field VR. The imaging range VC and the visual field VR may coincide with each other, or the imaging range VC may be present in the visual field VR.

The display system 1 is used to execute, as illustrated in FIG. 6, calibration in a state where the PC 300 exists in the imaging range VC of the camera 61.

In the exemplary embodiment, a reference point P1 is set on the display unit 330, and a reference position P2 is set on the image display unit 20. The reference point P1 is display a user can visually recognize, and is a so-called marker. The PC 300 can detect the reference point P1 from the captured image data of the camera 61, by image processing. The reference position P2 is set as a reference of a position in the image display unit 20, and may be a virtual position, or there may be no display nor object indicating the reference position P2.

The reference point P1 may be any object or position explicitly and visually recognized, and it is not necessary to newly provide display or an object to be the reference point P1. A specific position of a pattern or a shape on the display unit 330 such as one of four corners of the display unit 330 may be used as the reference point P1.

FIG. 7 is a flowchart illustrating an operation of the display system 1, and illustrates an operation of the PC 300 performing the calibration.

In the calibration, a user moves the head or the image display unit 20 to locate the reference point P1 at a preset position in the visual field VR of the user (step S11). When the position set in the visual field VR and the reference point P1 are superimposed on each other, the user performs an operation for confirming the position on the image display unit 20 or the PC 300 (step S12). For example, the user performs a knocking operation on the front frame 27 of the image display unit 20. This operation can be detected as acceleration by the six-axis sensor 235. Additionally, when the image display unit 20 is equipped with a knock sensor (not illustrated), such an operation can be detected based on a detection value of the knock sensor. The operation at step S12 may be an operation including detection by the touch sensor 332. Additionally, at step S12, the PC 300 may detect an operation by audio. Namely, in a configuration in which the PC 300 is equipped with a microphone, and the control unit 310 can process audio collected by the microphone, the control unit 310 can execute audio recognition processing for converting audio into a text, or audio command detection processing for detecting audio of a pattern registered in advance. In this configuration, the control unit 310 may detect audio produced by the user as an input operation at step S12.

The control unit 310 acquires captured image data of the camera 61 generated when the operation at step S12 is detected, and determines a position of the reference point P1 in the captured image data of the camera 61 (step S13). Accordingly, the position in the captured image data of the camera 61 is associated with the position in the visual field VR of the user wearing the image display unit 20. Therefore, when the PC 300 is imaged in the captured image data of the camera 61, a relative position of the PC 300 with respect to the visual field VR can be specified from this captured image data.

The control unit 310 acquires data about output values of the six-axis sensor 235 and the magnetic sensor 237 (step S14). The output values of the sensors acquired at step S14 indicate a reference position of the image display unit 20 in a state where the reference point P1 is superimposed on the set position in the visual field VR. For example, a direction and an amount of movement of the image display unit 20 from the reference position can be determined by integrating the output values of the six-axis sensor 235. Additionally, based on the output values of the magnetic sensor 237, a relative direction of the image display unit 20 with respect to the reference position of the image display unit 20 can be determined. Therefore, a relative position between the image display unit 20 and the PC 300 can be determined.

The control unit 310 generates calibration data including the output values acquired at step S14, stores the calibration data in the non-volatile storage 320 (step S15) and ends this processing.

For example, steps S13 and the S15 are executed by the position detection unit 313, and step S14 is executed by the detection value acquisition unit 312.

In the calibration processing illustrated in FIG. 7, the reference point P1 of the PC 300 and the set position in the visual field VR are made correspond to each other, and relative position relation of the image display unit with respect to the reference position of the image display unit is associated. The calibration data generated in this processing is, for example, data indicating a reference of a relative position between the reference point P1 and the visual field VR. In this calibration, in addition to superimposing the predetermined position in the visual field VR on the reference point P1, a technique in which the PC 300 is disposed in a preset distance from the image display unit 20 may be adopted at step S11. For example, at step S11, an image used for guiding placement of the PC 300 at a position separated by a predetermined distance from the image display unit 20 may be displayed by the image display unit 20. This image can be used as a marker such as a straight line, a rectangle, and a point indicating a size of the PC 300 visually recognized when the PC 300 is located at the position separated by the predetermined distance. The user may adjust a relative position between the PC 300 and the user to cause the PC 300 superimposed on the marker of the image display unit 20 to be visible, and subsequently, may make the reference point P1 correspond to the predetermined position to perform the operation at step S12.

Figure 8:
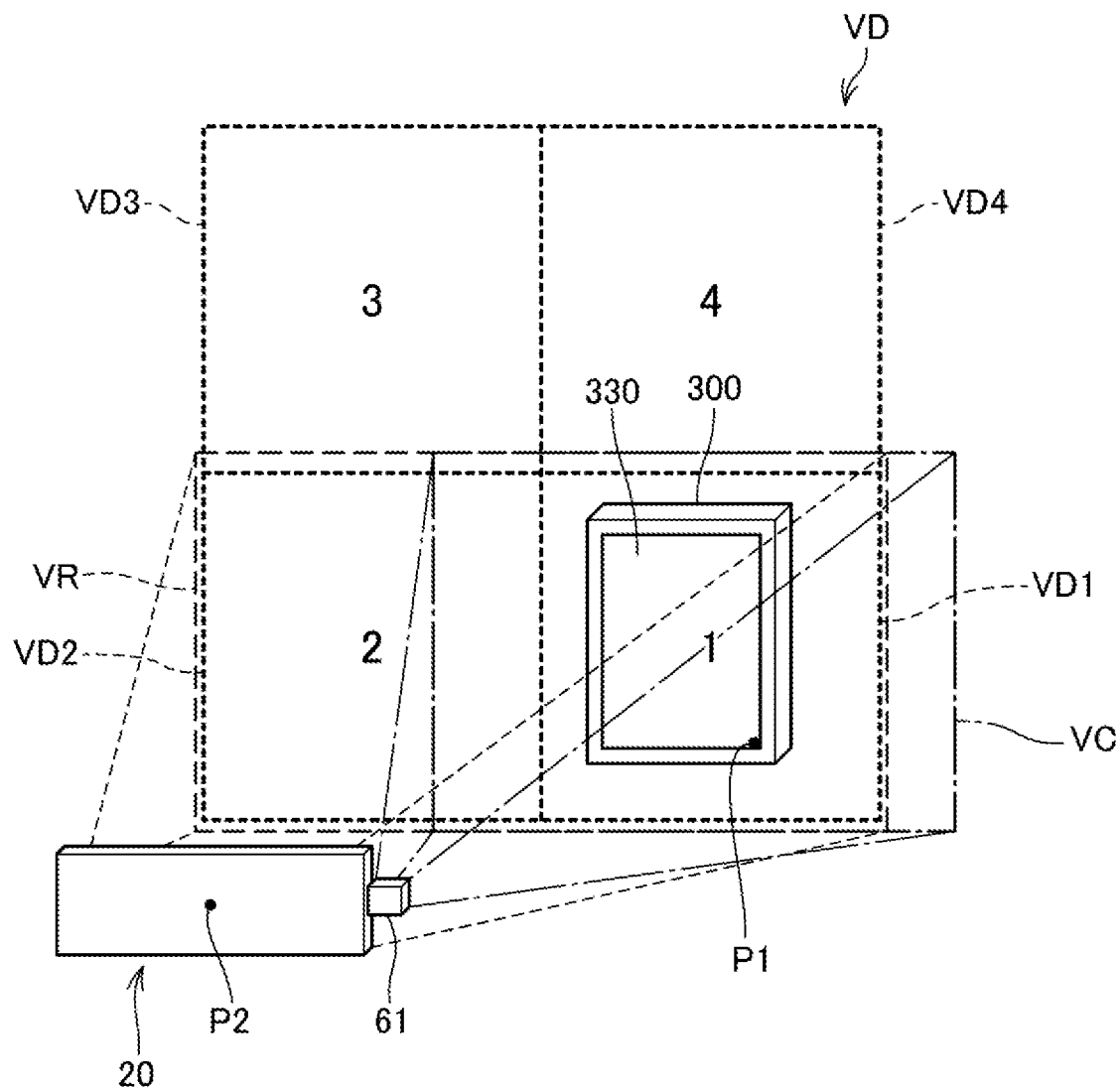
FIG. 8 is a view illustrating an example of a display mode of the display system.
Figure 9:
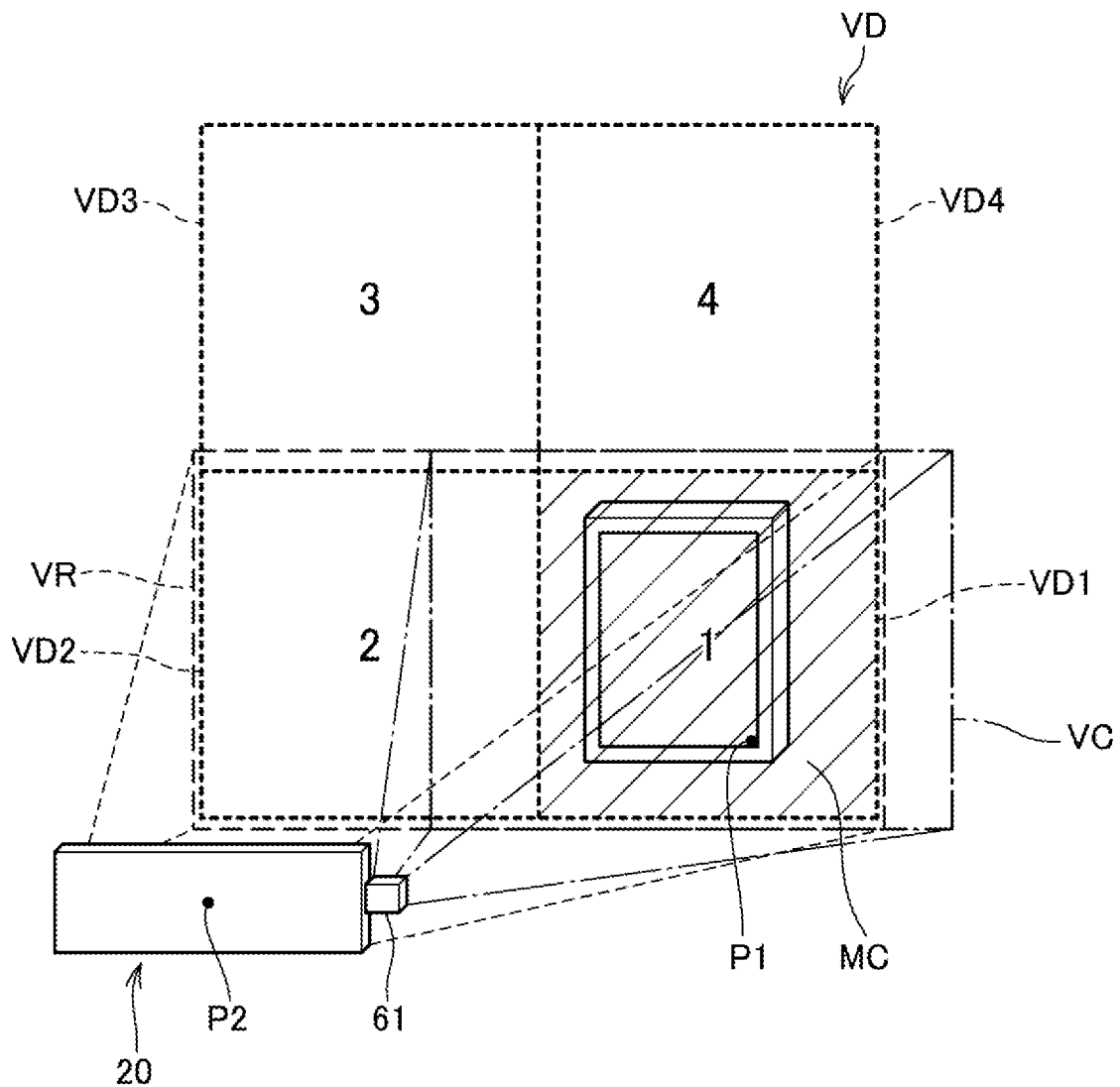
FIG. 9 is a view illustrating an example of a display mode of the display system.
Figure 10:
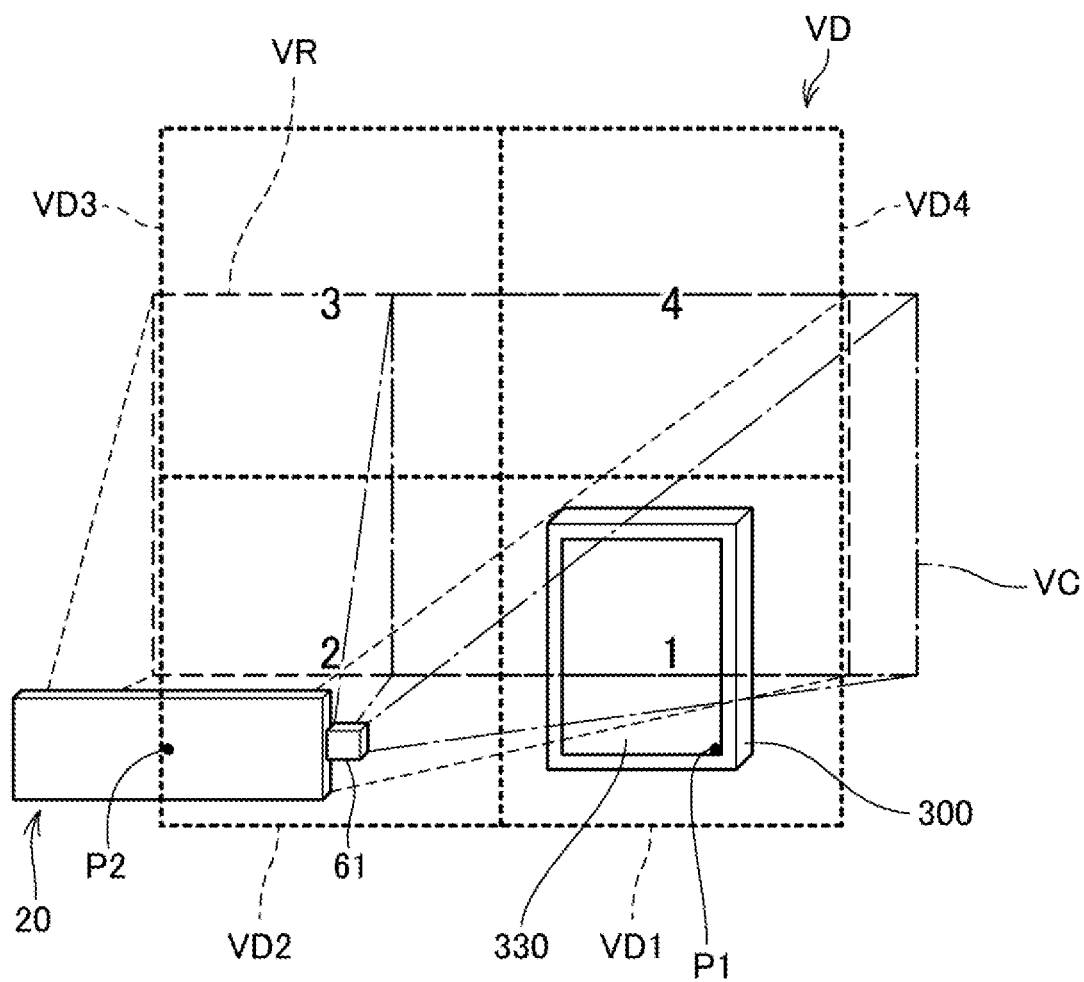
FIG. 10 is a view illustrating an example of a display mode of the display system.

Each of FIG. 8, FIG. 9, and FIG. 10 is a view illustrating an example of a display mode of the display system 1 in the exemplary embodiment. In each of FIG. 8, FIG. 9, and FIG. 10, a visual field VR in which the user wearing the image display unit 20 can visually recognize through the image display unit 20 is illustrated. Additionally, in the example illustrated in each of these figures, a size and a position of a display area in which the image display unit 20 displays an image to enable the user to visually recognize are identical to a size and a position of the visual field VR, and the display area and the visual field VR overlap with each other. The invention is applicable to a configuration in which a display area of the image display unit 20 is smaller than the visual field VR.

In FIG. 8, a virtual image VD generated by the PC 300 is illustrated. The virtual image VD includes an area VD1 including an image identical to an image the PC 300 causes the display unit 330 to display, and areas VD2, VD3, and VD4 adjacent to the area VD1. That is, the virtual image VD is an image having a size larger than a size of the image displayed by the display unit 330.

The PC 300 is configured to set a virtual display area larger than a display area of the display panel 331, and generate the virtual image VD as an image to be displayed in this display area. The virtual display area and the virtual image VD may differ in resolution or size, but in the exemplary embodiment, the virtual display area and the virtual image VD are described to coincide with each other in resolution or size.

In the following description, a size of each of the image displayed by the display unit 330, the virtual image VD, and the areas VD1, VD2, VD3, and VD4 is indicated by display resolution. For example, when display resolution of the display unit 330 is 1920 dots horizontally×1080 dots vertically and resolution of the virtual image VD and the virtual display area is 3840 dots×2160 dots, a size of the virtual image VD is four times the display image of the display unit 330.

Aspect ratios of the image displayed by the display unit 330 and the virtual image VD may differ from each other, but when the aspect ratios coincide with each other, there is an advantage that processing performed when the virtual image VD including the display image of the display unit 330 is generated can be executed rapidly. Additionally, there is an advantage that when the user visually recognizes both the display image of the display unit 330 and the virtual image VD, there is no uncomfortable feeling. Thus, the case where the aspect ratios coincide with each other is preferable. For a similar reason, the aspect ratios and the resolution of the respective areas VD1 to VD4 constituting the virtual image VD may not coincide with the aspect ratio and the resolution of the display unit 330, but preferably coincide with the aspect ratio and the resolution of the display unit 330. Additionally, the resolution of the virtual image VD may not be an integer multiple of the display resolution of the display unit 330, but is preferably an integer multiple.

The size of the virtual image VD is preferably identical to or larger than a size of an image that the image display unit 20 can display. Namely, the resolution of the virtual image VD is preferably equal to or greater than the display resolution of the display area of the image display unit 20. An example includes a configuration in which the display resolution of the display unit 330 is 1920 dots horizontally× 1080 dots vertically, and the display resolution of the image display unit 20 is 3840 dots×1080 dots, and the resolution of the virtual image VD is 3840 dots×2160 dots. Additionally, the aspect ratios of the virtual image VD and the display area of the image display unit 20 may differ from each other, and the aspect ratios and the resolution of the respective areas VD1 to VD4 may not coincide with the aspect ratio and the resolution of the display area of the image display unit 20. Additionally, the resolution of the virtual image VD may not be an integer multiple of the resolution of the display area of the image display unit 20.

It can be said that the virtual image VD is an expanded display area obtained by expanding the image the PC 300 causes the display unit 330 to display. For example, when the display unit 330 displays a screen for operation as a user interface of an operating system or an application program executed by the PC 300, the control unit 310 constitutes the screen for operation in correspondence to the display resolution of the display unit 330. When the virtual image VD is used, the control unit 310 constitutes the screen as the user interface in correspondence to the resolution of the virtual image VD, and causes the display unit 330 to display a portion of the screen. The same applies to a case where the PC 300 plays the content data 321, or a case where other images or the like are displayed. Accordingly, the virtual image VD includes the image displayed by the display unit 330. In other words, the display unit 330 displays a portion of the virtual image VD.

Additionally, the size of each of the virtual image VD, the display image of the display unit 330, and the image displayed by the image display unit 20 may be defined as a size in which the user wearing the image display unit 20 visually recognizes.

A size of an image is determined by a size of a pixel and resolution. It is appropriate that the size of the pixel of the display unit 330 be considered as a size of a pixel obtained when the user visually recognizes the display unit 330 through the image display unit 20. Additionally, since the virtual image VD is not visually recognized unless the image display unit 20 displays the virtual image VD, it is appropriate that the size of the pixel of the virtual image VD be considered as a size obtained when the user visually recognizes a pixel of the image displayed by the image display unit 20. Then, when a size in which the user wearing the image display unit 20 visually recognizes is a reference, the virtual image VD may be larger than the display unit 330. In this case, the resolution of the virtual image VD may be equal to or less than the display resolution of the display unit 330. Further, resolution of image data cut out of the virtual image VD and output to the image display unit 20 may be resolution equal to or less than the display resolution of the display unit 330. The control unit 310 is configured to perform resolution conversion for converting the display image of the display unit 330 to an image having lower resolution, in processing for generating the virtual image VD including the display image of the display unit 330, and add another image around the image obtained after the conversion to generate the virtual image VD.

Figure 11:
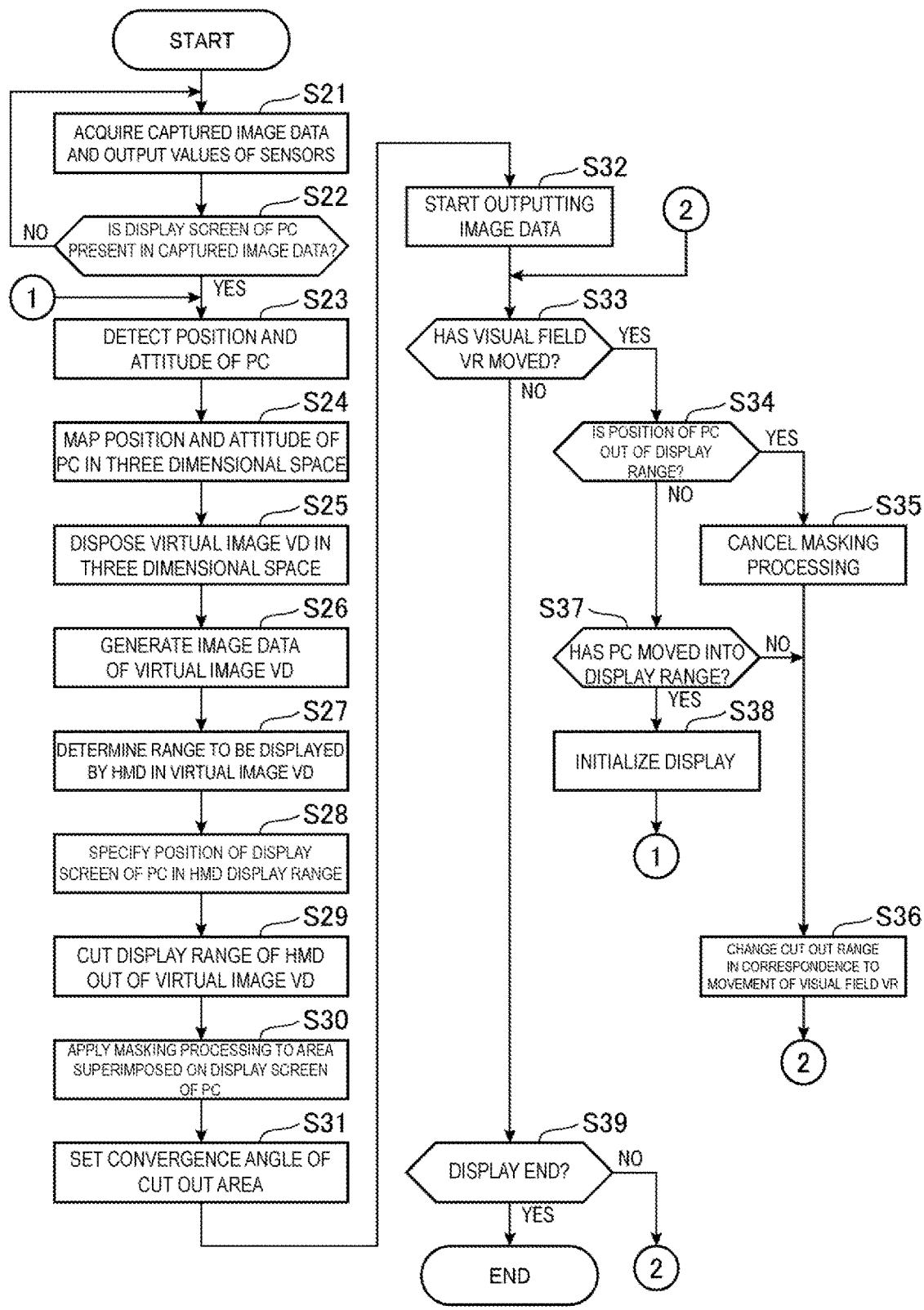
FIG. 11 is a flowchart illustrating an operation of the display system.

FIG. 11 is a flowchart illustrating an operation related to display of the display system 1, and particularly illustrates an operation of the PC 300. In the exemplary embodiment, the HMD 100 is configured to display an image based on image data output by the PC 300 via the HDMI cable 2A, and the PC 300 is configured to perform display control based on the relative position between the image display unit 20 and the PC 300.

Hereinafter, with reference to FIGS. 8 to 10 together with FIG. 11, the operation of the display system 1 will be described.

The operation illustrated in FIG. 11 is an operation in which the control unit 310 performs display using the virtual image VD. In response to an operation detected by the touch sensor 332, the control unit 310 instructs start of image output to the HMD 100, and when a display mode using the virtual image VD is specified, the control unit 310 executes the operation in FIG. 11.

In the following description, a case where the display unit 330 is present in a visual field of the image display unit 20 refers to a case where the user wearing the HMD 100 can visually recognize through the image display unit 20 the display unit 330 of the PC 300 as an outside scene. Visual fields of the right eye RE and the left eye LE through the image display unit 20, namely, the range of the outside scene visible to the user can be determined from a direction of the image display unit 20. Additionally, as illustrated in FIG. 4, in a case where relation between the angle of view of the camera 61, and the visual fields of the right eye RE and the left eye LE obtained when the outside scene is viewed through the image display unit 20 is known, the control unit 310 can determine from the captured image data of the camera 61 whether the display unit 330 is in the visual.

The control unit 310 acquires the captured image data of the camera 61 and the output value of each sensor from the connecting device 10 via the USB cable 2B (step S21). At step S21, the control unit 310 acquires at least the captured image data, and the output value of the distance sensor 64. Step S21 is executed by, for example, the detection value acquisition unit 312.

The control unit 310 determines whether the display unit 330 is present in the captured image data of the camera 61 (step S22). At step S22, the control unit 310 detects, for example, an image of the display unit 330 from the captured image data by pattern matching.

In a case where the display unit 330 is determined not to be present in the captured image data (step S22; NO), the control unit 310 returns to step S21.

In a case where the display unit 330 is determined to be present in the captured image data (step S22; YES), the control unit 310 detects, based on the output value of each sensor acquired at step S21, a position and an attitude of the display unit 330 (step S23). At step S23, the control unit 310 determines, for example, based on execution of Simultaneous Localization and Mapping (SLAM) or the detection value of the distance sensor 64, a relative position between the image display unit 20 and the display unit 330. Additionally, the control unit 310 may be configured to detect the reference point P1 of the display unit 330 by using the captured image data, and determine from the position of the reference point P1 detected the relative position of the display unit 330 with respect to the image display unit 20.

The control unit 310 maps, according to the position and the attitude determined at step S23, the position and the attitude of the display unit 330 in a three dimensional space (step S24). The position and the attitude of the display unit 330 are expressed by three dimensional coordinates with the reference position P2 being an origin or a reference point.

The control unit 310 disposes the virtual image VD in a three dimensional space, in correspondence to the position and the direction of the display unit 330 (step S25). A size of the virtual image VD is preset. For example, as set data (not illustrated), data defining the resolution of the virtual image VD or the position of the virtual image VD to be set with respect to the display unit 330 is stored in the non-volatile storage 320.

The control unit 310 disposes the virtual image VD to be parallel to the display unit 330, and to be a face superimposed on the display unit 330. In other words, the virtual image VD includes the display unit 330, and is a virtual plane larger than the display unit 330. The control unit 310 determines three dimensional coordinates with the reference position P2 being an origin or a reference point, as for a reference position based on which a position of the virtual image VD such as positions of four corners or a position of the center of the virtual image VD can be specified.

The control unit 310 generates image data of the virtual image VD (step S26). The virtual image VD is a screen obtained by virtually expanding the display unit 330 as described above, and, for example, is a screen constituting a user interface of an operating system.

The control unit 310 determines the range to be displayed in the virtual image VD by the image display unit (step S27). As illustrated in FIG. 8, the image display unit 20 displays a portion of the virtual image VD. The control unit 310 determines the range to be displayed in the virtual image VD by the image display unit 20 from a direction of the image display unit 20 and a relative position with respect to the virtual image VD.

The control unit 310 specifies a position of the display unit 330 in the range in which the image display unit 20 displays an image (step S28). The image display unit 20 displays an image on the half mirrors 261 and 281, and the range in which the image is visually recognized is superimposed on the visual field VR in the examples in FIG. 8 to FIG. 10. When the display unit 330 is visually recognized through the image display unit 20 in the visual field VR of the user wearing the image display unit 20, the control unit 310 specifies a position at which the display unit 330 is visible in the visual field VR. This position can be determined from the position and the attitude of the PC 300 specified at step S23.

The control unit 310 performs processing for cutting out or extracting the image present in the range to be displayed by the image display unit 20 from the virtual image VD (step S29), and applies masking processing to the cut out image (step S30). The range in which the masking processing is applied at step S30 is the range in which the display unit 330 is superimposed on the image to be displayed by the image display unit 20, or the range including a portion superimposed on the display unit 330.

In the example illustrated in FIG. 8, the areas VD1 and VD2 of the virtual image VD are cut out as the range to be displayed by the image display unit 20. The display unit 330 is visually recognized at a position at which the area VD1 is displayed. In this case, the control unit 310 may apply the masking processing to all the area VD1, or may apply the masking processing only to the range in which the area VD1 is superimposed on the display unit 330.

The user can visually recognize an outside scene passing through the image display unit 20 in a state where the image display unit 20 displays the virtual image VD. Here, when the display unit 330 is present in the visual field VR that the image display unit 20 visually recognizes as the outside scene, an image displayed by the display unit 330 and an image displayed by the image display unit 20 superimposed on each other are visible for the user. To provide a better visual experience to the user in the above-described state, in the exemplary embodiment, processing for adjusting a display mode of the image display unit 20 to enhance visibility of the display unit 330 is performed. This processing is referred to as the masking processing.

FIG. 9 illustrates a state in which the control unit 310 applies the masking processing. In an example in FIG. 9, the masking processing is applied to all the area VD1 being the range superimposed on the display unit 330. The masking processing is, for example, processing for turning color data of a pixel (so-called pixel data, a pixel value) into a black color or a dark color. The image display unit 20 displays an image by causing light emitted by the OLED units 221 and 241 to enter the right eye RE and the left eye LE, and thus when the pixel value turns into the black color or the dark color, amounts of light entering the right eye RE and the left eye LE decrease. When an amount of light emitted by the image display unit 20 decreases, an amount of light of the outside light OL passing through the image display unit 20 relatively increases, and thus visibility of the outside scene is enhanced. Therefore, the user can visually recognize the outside scene favorably in the range in which the masking processing is applied, and the visibility of the display unit 330 as the outside scene is enhanced by the masking processing.

Accordingly, the masking processing performed by the control unit 310 is processing in which a pixel value of image data output to the connecting device 10 to cause the image display unit 20 to display is set to the black color (R, G, B=0, 0, 0) or a preset dark color to reduce an amount of light.

Since the pixel value in the range including the image displayed by the display unit 330 is changed by the masking processing to the black color or to the dark color in the image data that the PC 300 outputs to the connecting device 10, the image displayed by the display unit 330 is substantially removed. Accordingly, when the range in which the image display unit 20 displays an image is superimposed on the display unit 330, the control unit 310 outputs to the connecting device 10 the image data obtained by removing the image displayed by the display unit 330.

In the image data subjected to the masking processing, the image in the area VD1 being the area superimposed on the display unit 330 is removed by a mask, and an image in an area located around the removed image (the area VD2 in FIG. 10) is displayed by the image display unit 20.

The control unit 310 sets a convergence angle of the image subjected to the masking processing (step S31). At step S31, the control unit 310 sets the convergence angle of the image such that a portion of the virtual image VD to be displayed by the image display unit 20 is visually recognized as a plane including the display unit 330. The PC 300 outputs image data including image data of an image to be displayed by the right display unit 22 of the image display unit 20, and image data of an image to be displayed by the left display unit 24. The control unit 310 adjusts a position of the virtual image VD in the image for the right display unit 22, and a position of the virtual image VD in the image for the left display unit 24 to adjust a convergence angle between the left eye LE and the right eye RE of the user.

The control unit 310 starts outputting the image data to the connecting device 10 (step S32). The connecting device 10 starts a processing in which the image data input to the I/F unit 110 is decoded by the display controller 122, and is displayed by the right display unit 22 and the left display unit 24.

Steps S24 to S32 are, for example, executed by the image adjustment unit 315.

After the start of the display, the control unit 310 determines whether the visual field VR has moved (step S33).

Here, the movement of the visual field VR means movement of a relative position of the visual field VR with respect to the virtual image VD. At step S33, the image adjustment unit 315 performs the determination based on a detection value of the position detection unit 313. Additionally, the following steps S34 to S39 are executed by the image adjustment unit 315.

FIG. 10 illustrates an example in which the visual field VR has moved. In the example in FIG. 10, the visual field VR has moved upward as compared to the state in FIG. 9. Owing to this movement, the visual field VR is superimposed on the areas VD1, VD2, VD3, and VD4 to cross the areas VD1, VD2, VD3, and VD4.

When the control unit 310 determines that the visual field VR has moved (step S33; YES), the control unit 310 determines whether a position of the PC 300, more specifically a position of the display unit 330 is out of the range in which the image display unit 20 displays an image (step S34). At step S34, the control unit 310 performs the determination based on a relative position and a relative direction between the image display unit 20 and the display unit 330.

When the control unit 310 determines that the position of the display unit 330 is out of the display range of the image display unit 20 (step S34; YES), the control unit 310 cancels the masking processing applied at step S30 (step S35). The control unit 310 changes, in correspondence to the visual field VR having moved, the range to be cut out of the virtual image VD (step S36), and returns to step S33.

In the example illustrated in FIG. 10, the control unit 310 cuts the range crossing the areas VD1, VD2, VD3, and VD4 out of the virtual image VD, generates image data corresponding to the cut out image, and outputs the generated image data to the connecting device 10. Accordingly, the image display unit 20 displays the range in which the virtual image VD is superimposed on the visual field VR.

Additionally, when the control unit 310 determines that the position of the display unit 330 is not out of the display range of the image display unit 20 (step S34; NO), the display unit 330 is within the display range of the image display unit 20. In this case, the control unit 310 determines whether the display unit 330 has moved from an outside of the display range of the image display unit 20 into the display range (step S37).

In a case where, owing to the movement of the visual field VR, the display unit 330 enters the display range from the state where the display unit 330 has been out of the display range of the image display unit 20 (step S37; YES), the control unit 310 initializes a state of image data to be output to the connecting device 10 (step S38). During the initialization, the control unit 310 resets application/cancellation of the masking processing, the range to be cut out of the virtual image VD, or the like in the image data output to the connecting device 10 to an initial state. The control unit 310 returns to step S23, and executes again the processing for starting output of the image data.

Specific examples of the initialization processing at step S38 includes the following examples. A first example includes processing in which when it is determined that all the display unit 330 has entered the visual field VR at step S37, the virtual image VD disposed and processed at step S25 previously executed is used to generate a display image. Additionally, second processing includes processing for executing the processing at step S23 and the subsequent steps in correspondence to the position of the display unit 330, and newly resetting a position of the virtual image VD (including a depth). In addition to these kinds of processing, a specific example of the processing performed by the control unit 310 is arbitrary.

Additionally, in a case where the display unit 330 has not moved from the outside of the display range of the image display unit 20 into the display range (step S37; NO), namely, in a case where the state in which the display unit 330 is in the display range of the image display unit 20 is continued, the control unit 310 shifts to step S36.

Additionally, when the control unit 310 determines that the visual field VR has not moved (step S33; NO), the control unit 310 determines whether to end the display (step S39). For example, when the display end is instructed by an operation on the display unit 330 or the like (step S39; YES), the control unit 310 stops outputting the image data to the connecting device 10 and ends this processing. On the other hand, when the display is to be continued (step S39; NO), the control unit 310 returns to step S33.

At step S33, in a case where the image display unit 20 has moved, for example, in a case where the user wearing the image display unit 20 has moved the head, the control unit 310 determines that the visual field VR has moved. Additionally, in a case where the PC 300 has moved in a state where the image display unit 20 has not moved, and accordingly, a relative position between the image display unit 20 and the PC 300 has changed, it may also be determined that the visual field VR has moved. That is, the movement of the visual field VR detected at step S33 is a change in the relative position between the image display unit 20 and the PC 300, and includes a case where the image display unit 20 moves, a case where the PC 300 moves, and a case where both the image display unit 20 and the PC 300 move.

Therefore, in any of a case where the user has moved the head, and a case where the user or another person has moved the PC 300, the processing at step S34 and the subsequent steps is executed depending on whether the position of the PC 300 is within the display range of the image display unit 20.

In the processing illustrated in FIG. 7 and FIG. 11, the display system 1 may use the captured image data of the camera 61, instead of the distance sensor 64, to detect a distance. For example, the display system 1 stores in advance as reference data in the non-volatile storage 130 or the non-volatile storage 320 data for associating a distance from the image display unit 20 to an object to be captured with a size of an image of an object to be captured and imaged in the captured image data of the camera 61. In this case, the control unit 310 can calculate a distance from the image display unit 20 to the PC 300 or to the display unit 330, based on a size of an image of the PC 300 or the display unit 330 in the captured image data of the camera 61, and the reference data.

As described above, the display system 1 in the first exemplary embodiment includes the PC 300 including the display unit 330, and the HMD 100 connected with the PC 300. The PC 300 includes the I/F unit 341 configured to output an image. The HMD 100 includes the I/F unit 110 configured to acquire the image data output by the PC 300. Additionally, the HMD 100 includes the image display unit 20 configured to enable an outside scene to be visually recognized, superimpose an image on the outside scene visually recognized in a state where the HMD 100 is worn, and display the image, and the display controller 122 configured to cause the image display unit 20 to display the image acquired by the acquisition unit. The display controller 122 is configured to cause the image display unit 20 to display the image in correspondence to the position of the PC 300 visually recognized as the outside scene.

Additionally, the PC 300 corresponds to the electronic device of the invention connected with the HMD 100. The PC 300 includes the display unit 330, and the I/F unit 341 configured to output an image data to the HMD 100. Additionally, the PC 300 includes the control unit 310 configured to determine a relative position of the display unit 330 with respect to the image display unit 20 of the HMD 100. The control unit 310 is configured to generate, based on the relative position of the display unit 330 with respect to the image display unit 20, image data used for the image display unit 20 to display an image corresponding to the position of the display unit 330 visually recognized as the outside scene, and output the generated image data from the I/F unit 341.

According to the display system 1 and the PC 300 to which the invention is applied, an image output by the PC 300 can be displayed by the HMD 100 in correspondence to the position of the display unit 330 of the PC 300 as the outside scene. For example, the image can be displayed by the HMD 100 in correspondence to the position of the display unit 330 of the PC 300 visible as the outside scene. Accordingly, the display corresponding to the display unit 330 of the PC 300 visually recognized as the outside scene can be performed by the HMD 100 configured to superimpose the image on the outside scene and display the image.

Additionally, the control unit 310 is configured to generate the virtual image VD corresponding to a virtual display area wider than the display unit 330. The control unit 310 is configured to cause the display unit 330 to display a portion of the virtual image VD generated in correspondence to the virtual display area, and cause the I/F unit 341 to output an image for display including at least a portion of the virtual image VD. For example, the control unit 310 is configured to cause the display unit 330 to display a portion of the virtual image VD, and cause the I/F unit 341 to output an image obtained by removing a portion displayed by the display unit 330 from the virtual image VD. Additionally, the display system 1 is configured to cause the image display unit 20 provided in the HMD 100 to display an image based on image data output by control of the control unit 310, in correspondence to the position of the display unit 330 visually recognized as the outside scene. Specifically, image data obtained by masking an area corresponding to a position superimposed on the display unit 330 in the image display unit 20 is output by the PC 300 to the connecting device 10. Thus, display corresponding to the virtual image VD wider than the display unit 330 of the PC 300 can be performed on the image display unit 20 of the HMD 100. Thus, the display unit 330 of the PC 300 can be expanded virtually by the HMD 100.

Additionally, the control unit 310 is configured to generate image data obtained by removing an area displayed by the display unit 330 from the virtual image VD, and cause the I/F unit 341 to output the image data. The control unit 310 is configured to cause the image display unit 20 provided in the HMD 100 to display an image for display output by control of the control unit 310, around the display unit 330 visually recognized as the outside scene. That is, when the virtual image VD corresponding to the virtual display area wider than the display unit 330 of the PC 300 is displayed by the HMD 100, the virtual image VD obtained by removing an area displayed by the display unit 330 is displayed. Thus, display of the display unit 330 and display of the HMD 100 can be combined not to overlap with each other. For example, the image is displayed by the HMD 100 around the display unit 330 of the PC 300 and thus, the display mode in which the display unit 330 is virtually expanded can be achieved.

Additionally, the control unit 310 is configured to determine a relative position of the display unit 330 with respect to the image display unit 20 of the HMD 100, and is configured to, based on the obtained relative position, perform the masking processing, generate image data, and cause the I/F unit 341 to output the image data. Accordingly, since the image data is generated in correspondence to the relative position of the display unit 330 with respect to the image display unit 20, display corresponding to the position of the display unit 330 of the PC 300 can be achieved easily by the HMD 100.

Additionally, the control unit 310 is configured to generate the virtual image VD and determine a position of the virtual image VD based on a position of the PC 300 in a real space. The control unit 310 is configured to adjust a display mode of the virtual image VD to be displayed by the image display unit 20 to correspond to a relative position between the virtual image VD and the image display unit 20. Accordingly, the virtual image VD can be displayed by the HMD 100 in correspondence to the position of the display unit 330 of the PC 300 in the real space. An effect such as supplementing or expanding the display unit 330 can be obtained by this virtual image VD.

Additionally, the control unit 310 is configured to initialize a display mode of the virtual image VD by using a position of the display unit 330 detected as a reference when the control unit 310 detects that the display unit 330 is present in the range visually recognized as an outside scene in the image display unit 20. Accordingly, the display mode can be adjusted in correspondence to whether the display unit 330 of the PC 300 can be recognized visually as the outside scene in the HMD 100. Additionally, even when a visual recognition state of the display unit 330 of the PC 300 changes while the HMD 100 displays an image, an appropriate response to such a change can be made.

Additionally, the image display unit 20 includes the left display unit 24 configured to emit imaging light toward the left eye LE of the user, and the right display unit 22 configured to emit imaging light toward the right eye RE of the user in a state where the image display unit 20 is worn on the head of the user. Then, the control unit 310 is configured to control a display position by the left display unit 24 and a display position by the right display unit 22 in correspondence to a position of the display unit 330 visually recognized as an outside scene of the image display unit 20, and adjust a convergence angle of an image to be displayed by the image display unit 20. In this case, the convergence angle of the image to be displayed by the HMD 100 is adjusted, and accordingly, a distance in which the display image of the HMD 100 is visually recognized can be made correspond to the position of the display unit 330 of the PC 300. Accordingly, the display by the HMD 100 and the display by the display unit 330 of the PC 300 can be coordinated more appropriately.

Note that, in the processing in FIG. 11, the display unit 330 may excessively approach to the image display unit 20 to an extent that the display unit 330 blocks a field of view passing through the image display unit 20. An example of such a case includes a case where the position of the display unit 330 detected at step S23 is closer to the image display unit 20 than the preset range. In this case, the control unit 310 may stop image output to the connecting device 10 and return to step S21.

In the above-described exemplary embodiment, the control unit 310 is configured to adjust image display positions in an image for the right eye RE and in an image for the left eye LE, and control a convergence angle to control a visual recognition distance that the user perceives to a display image of the image display unit 20.

When the image display unit 20 can adjust the visual recognition distance that the user perceives to the display image of the image display unit 20, by optical systems provided in the right display unit 22 and the left display unit 24, this adjustment by control of the optical systems may be performed instead of the control of the convergence angle. That is, the optical system may be controlled such that the user perceives the display image of the image display unit 20 being a portion of the virtual image VD as an image located at an identical position to a position of the display unit 330. In this case, a distance in which the display image of the image display unit 20 is visually recognized can be made correspond to the position of the display unit 330 of the PC 300, and the display by the HMD 100 and the display by the PC 300 can be coordinated more appropriately.

An example of the above-described optical system includes a configuration in which a lens movable in a left-right direction connecting the right eye RE and the left eye LE is provided. In this configuration, the lens movable in the left-right direction is disposed in each of the right display unit 22 and the left display unit 24. The lenses may be disposed, for example, between the right optical system 251 and the half mirror 261, and between the left optical system 252 and the half mirror 281, respectively. Additionally, the lens may be disposed inside each of the right optical system 251 and the left optical system 252. Since a position of imaging light entering each of the right eye RE and the left eye LE moves in the left-right direction according to the position of the lens, the convergence angle can be changed. In this example, since the control unit 120 is configured to control the movement of the lens, and the control unit 310 is configured to output image data, and control data for specifying the lens position to the connecting device 10, a convergence angle calculated by the control unit 310 can be achieved.

Additionally, as an optical system used by the image display unit 20 to output imaging light, a holography display device may be provided. In this case, the image display unit 20 includes, for example, a light source, and a Spatial Light Modulator (SLM) configured to modulate light from the light source. The SLM can use, for example, a reflection type spatial light phase modulator using liquid crystal (Liquid Crystal On Silicon (LCOS)-SLM). In this configuration, the connecting device 10 outputs display data to the SLM, and accordingly, reference light emitted from the light source is modulated by the SLM to form a stereoscopic image. In this case, image data output by the PC 300 to the connecting device 10, or display data generated by the display controller 122 from the image data output by the PC 300 are adjusted and thus, a focal distance of the stereoscopic image formed by the image display unit 20 can be adjusted. Thus, instead of the control for adjusting the convergence angle in the exemplary embodiment, the focal distance of the stereoscopic image is controlled in the image display unit 20 configured as the holography display device and thus, a distance to which the user visually recognizes an image displayed by the image display unit 20 can be adjusted.

Additionally, a configuration in which a dimming shade is provided on an outer side of the image display unit 20 may be adopted. The dimming shade is a plate shaped electronic device including a liquid crystal panel or the like, and having light transmittance changing according to control of the control unit 310. When the dimming shade is provided on the image display unit 20, outside light OL passing through the dimming shade and further passing through the right light-guiding plate 26 and the left light-guiding plate 28 enters the right eye RE and the left eye LE of the user wearing the image display unit 20. The user visually recognizes the outside scene by the outside light passing through the dimming shade and the image display unit 20. Therefore, according to transmittance (light transmittance) of the dimming shade, visibility at which the user visually recognizes the outside scene changes.

When the control unit 310 executes the masking process, to enhance visibility of an area subjected to the masking process, the control unit 310 may perform control for enhancing the transmittance of the area in the dimming shade.

In the above-described first exemplary embodiment, the configuration in which a position of the display unit 330 in a display range of the image display unit 20 is specified, and an image is displayed by the image display unit 20 in correspondence to the position of the display unit 330 is described. That is, the image is displayed in correspondence to the relative position between the image display unit 20 and the display unit 330. The invention is not limited to this configuration, and for example, a position of the PC 300 in a display range of the image display unit 20 may be detected or specified by using a portion or all of appearance of the PC 300 as a reference.

Namely, the control unit 310 determines, at step S22, whether at least a portion of the appearance of the PC 300 is present in the captured image data of the camera. At step S22, the control unit 310 detects, for example, an image of the PC 300 from the captured image data by pattern matching. Here, the control unit 310 may detect a shape of a corner of a housing of the PC 300, a shape of a border portion between the display unit 330 and the housing in the PC 300, a shape of a back surface side of the PC 300, a painting color of a back surface of the PC 300, or the like from the captured image of the camera 61 by the pattern matching. Additionally, the control unit 310 may detect a marker attached or fixed to the housing of the PC 300 from the captured image of the camera 61. As the marker, for example, an image code such as a bar code and a two dimensional code, a character, or other images can be used. Additionally, a pattern or a shape of an outer packaging of the PC 300 may be a pattern or a shape functioning as a marker. For example, the PC 300 is not limited to a plane shape illustrated in FIG. 1, and may be a shape having a protrusion or a concave, or may include a configuration in which the control unit 310 detects the protrusion or the concave. In this case, the control unit 310 may specify a position or an attitude of the PC 300 from the captured image data, and may determine a relative position of the PC 300 with respect to the image display unit 20. Additionally, the control unit 310 may perform processing for determining the relative position of the PC 300 with respect to the image display unit 20, and based on the obtained relative position, determining a relative position between the image display unit 20 and the display unit 330.

2. Second Exemplary Embodiment

Figure 12:
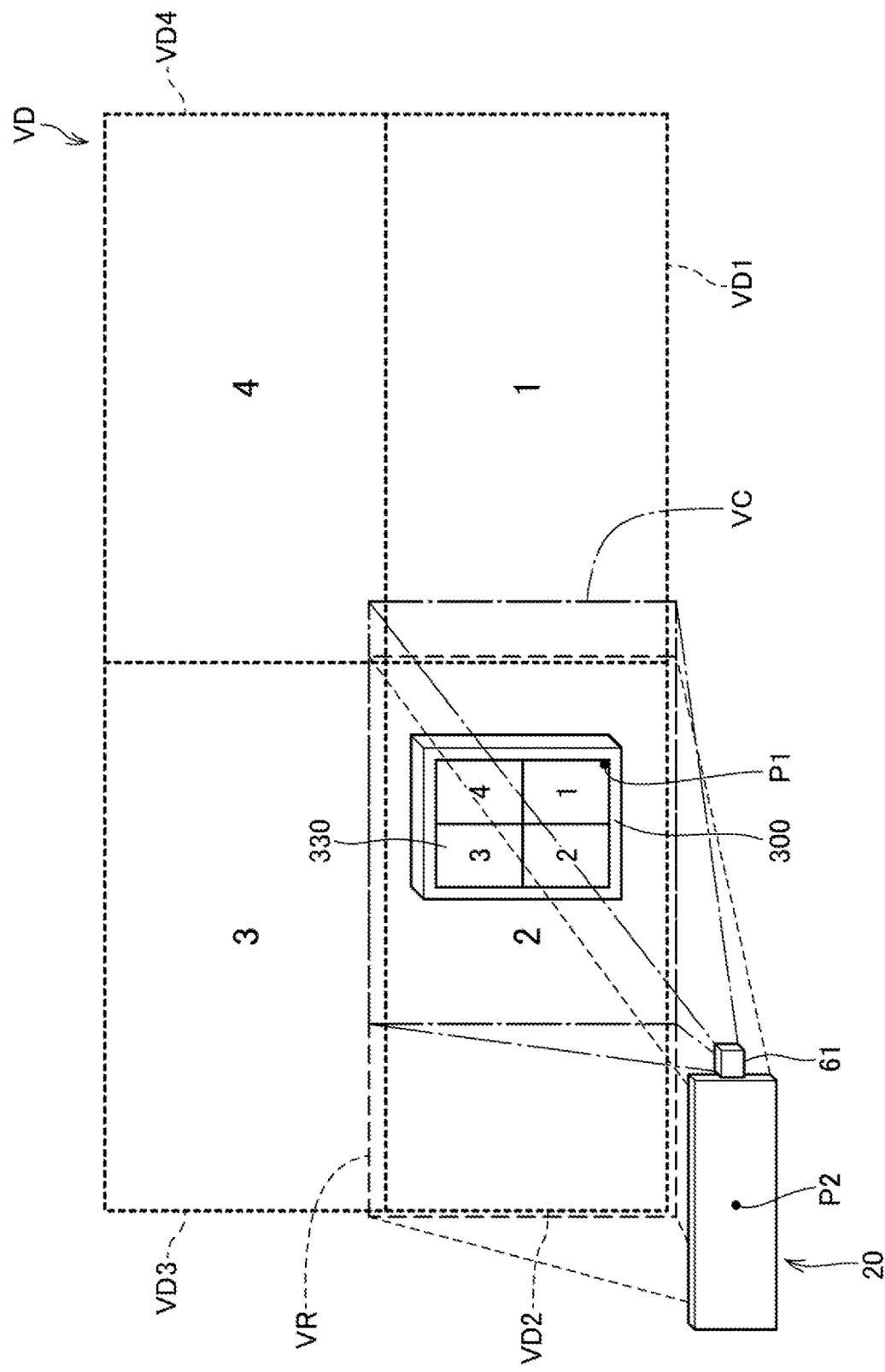
FIG. 12 is a view illustrating an example of a display mode of a display system in a second exemplary embodiment.

FIG. 12 is a view illustrating an example of a display mode in a second exemplary embodiment to which the invention is applied.

The second exemplary embodiment is an example in which a virtual image VD different from the virtual image VD in the first exemplary embodiment is formed by a display system 1 including a common configuration to the configuration of the display system 1 in the first exemplary embodiment.

The virtual image VD illustrated in FIG. 12 is, in a manner similar to the virtual image VD illustrated in FIG. 8, an image having a size larger than a size of an image displayed by a display unit 330. In the second exemplary embodiment, a control unit 310 is configured to dispose all the image displayed by the display unit 330 in a virtual display area to generate the virtual image VD.

As illustrated in FIG. 12, the image displayed on all the virtual image VD includes identical contents to all the image displayed by the display unit 330. The control unit 310 is configured to perform resolution conversion to generate the virtual image VD when resolution of a virtual display area does not coincide with resolution of the image displayed by the display unit 330 or display resolution of the display unit 330.

The virtual image VD is divided into areas VD1, VD2, VD3, and VD4. A portion obtained by dividing a display image of the display unit 330 is assigned to each of the areas VD1 to VD4. In the virtual image VD in FIG. 12, the display image of the display unit 330 is divided by four, and the divided areas are displayed in the areas VD1, VD2, VD3, and VD4, respectively.

In processing for cutting out (extracting) the range to be displayed by an image display unit 20 from the virtual image VD (step S29 and step S36 in FIG. 11), the control unit 310 cuts out any of the areas VD1 to VD4 as a unit. That is, image data of any of the areas VD1 to VD4 is output to a connecting device 10.

Then, in processing for determining whether a visual field VR has moved (step S33), in a case where the visual field VR has crossed any of borders of the areas VD1 to VD4, the control unit 310 determines that the visual field VR has moved. In this determination, in a case where the center of the visual field VR has moved across any of the borders of the areas VD1 to VD4, namely, in a case where the center has moved from any of the areas VD1 to VD4 to the area adjacent, the control unit 310 determines positively.

In the second exemplary embodiment, a PC 300 is configured to cause the display unit 330 to display an image corresponding to the display unit 330, generate the virtual image VD corresponding to the display image of the display unit 330, and cause image data of an image including at least a portion of the virtual image VD to be output. The display system 1 is configured to cause the image display unit 20 provided in an HMD 100 to display an image based on image data output by control of the control unit 310, in correspondence to a position of the display unit 330 visually recognized as an outside scene. Accordingly, at least a portion of the image displayed by the display unit 330 of the PC 300 can be displayed by the image display unit 20, in correspondence to the position of the display unit 330 visually recognized as the outside scene in the image display unit 20. Thus, a display image of the display unit 330 and an image displayed by the HMD 100 can be coordinated.

Additionally, the control unit 310 is configured to cause the I/F unit 341 to output an image obtained by cutting out a portion of the virtual image VD, and thus a portion of the display image of the display unit 330 can be expanded and displayed by the image display unit 20.

Additionally, the control unit 310 is configured to determine a relative position of the display unit 330 with respect to the image display unit 20 of the HMD 100, and based on the relative position determined, generate image data. Accordingly, display corresponding to the position of the display unit 330 of the PC 300 can be achieved easily by the HMD 100 including the image display unit 20.

3. Third Exemplary Embodiment

Figure 13:
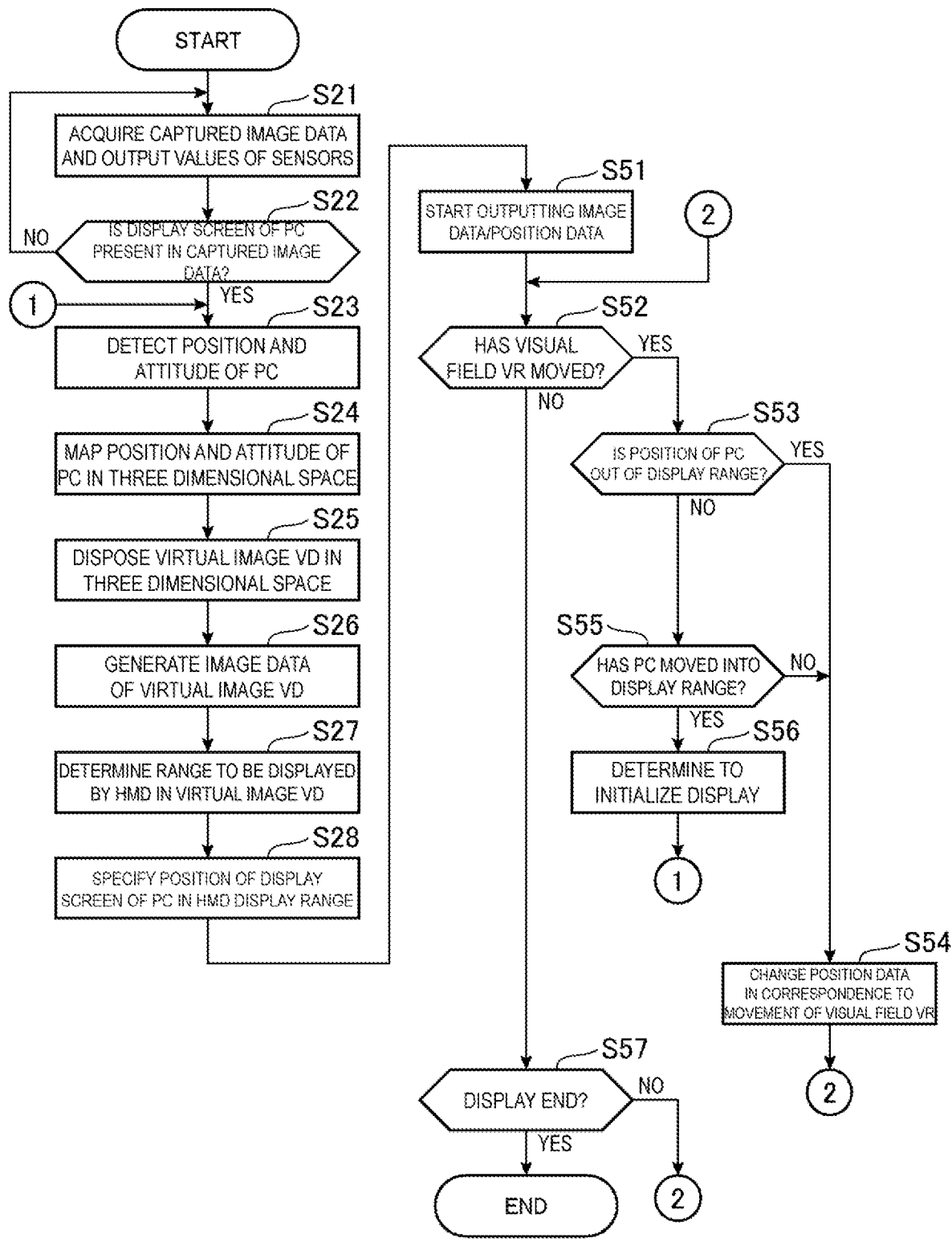
FIG. 13 is a flowchart illustrating an operation of a display system in a third exemplary embodiment.
Figure 14:
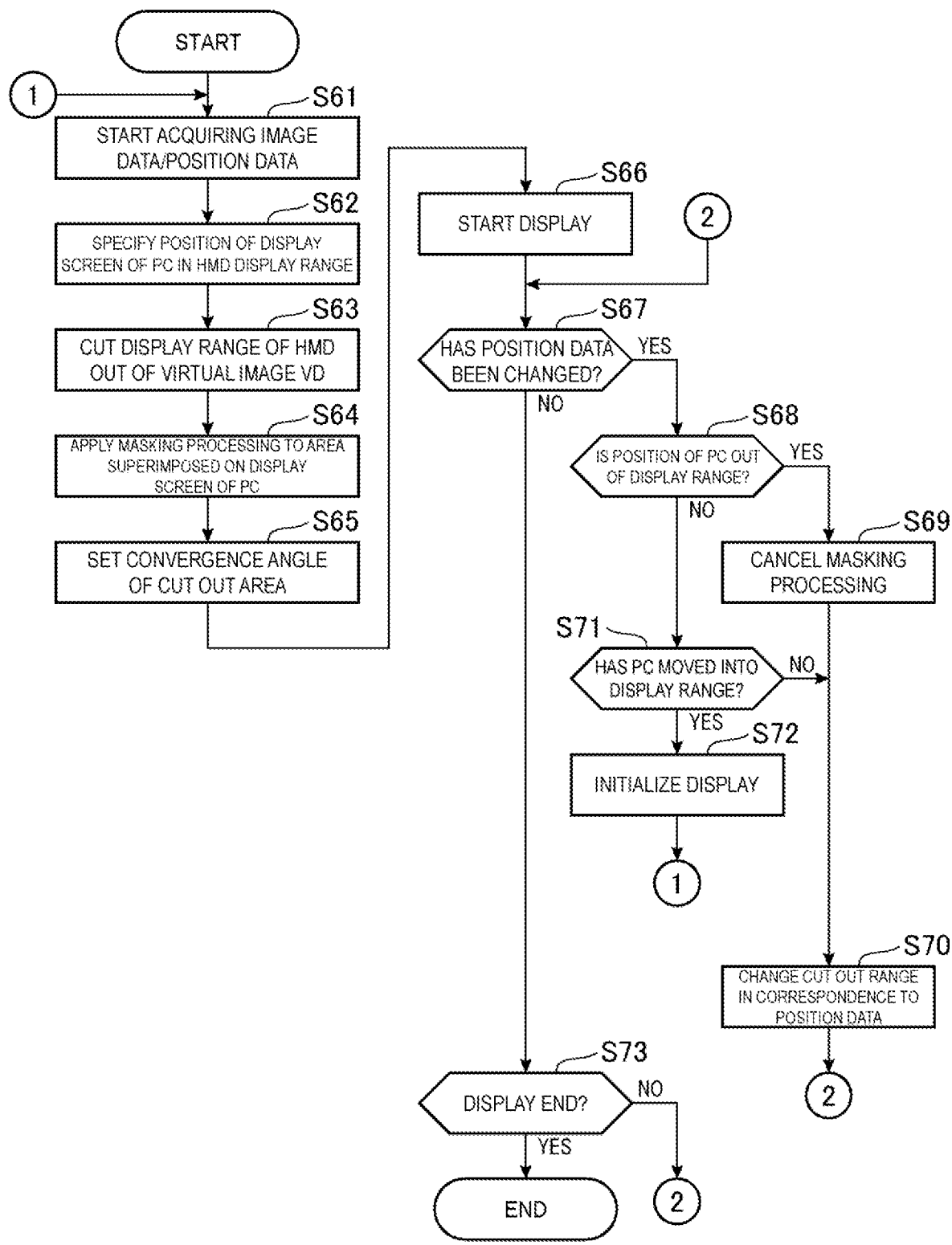
FIG. 14 is a flowchart illustrating an operation of the display system in the third exemplary embodiment.

Each of FIG. 13 and FIG. 14 is a flowchart illustrating an operation of a display system 1 in a third exemplary embodiment to which the invention is applied. FIG. 13 illustrates an operation of a PC 300, and FIG. 14 illustrates an operation of an HMD 100.

The third exemplary embodiment is an example in which an operation different from the operation in the first exemplary embodiment is executed by the display system 1 including a common configuration to the configuration of the display system 1 in the first exemplary embodiment.

In the third exemplary embodiment, while processing for detecting a relative position of the PC 300 with respect to an image display unit 20 is executed by the PC 300, processing for cutting out a portion of a virtual image VD generated by the PC 300 is executed by the HMD 100.

In the flowchart illustrated in FIG. 13, common processing to the processing in FIG. 11 is denoted by an identical step number and description of the common processing will be omitted.

A control unit 310 is configured to execute processing at steps S21 to S28. At step S28, the control unit 310 specifies a position of a display unit 330 in the range in which the image display unit 20 displays an image (step S28). Here, the control unit 310 starts processing for outputting position data indicating the position of the display unit 330 specified at step S28, together with image data of the virtual image VD to the HMD 100 (step S51). The position data output by the control unit 310 at step S51 is data for cutting the image present in the range displayed by the image display unit 20 out of the virtual image VD.

The control unit 310 determines in a manner similar to step S32 (FIG. 11) whether a visual field VR has moved (step S52). At step S52, an image adjustment unit 315 performs the determination based on a detection value of a position detection unit 313. Additionally, steps S53 to S57 described below are executed by the image adjustment unit 315.

When the control unit 310 determines that the visual field VR has moved (step S52; YES), the control unit 310 determines whether a position of the PC 300 is out of the range in which the image display unit 20 displays an image (step S53). At step S53, the control unit 310 may determine whether the position of the display unit 330 is out of the range in which the image display unit 20 displays an image. At step S53, the control unit 310 performs the determination based on a relative position and a relative direction between the image display unit 20 and the display unit 330.

When it is determined that the position of the PC 300 is out of the display range of the image display unit 20 (step S53; YES), position data to be output to the HMD 100 is changed in correspondence to the visual field VR having moved (step S54), and the processing returns to step S52.

When the control unit 310 determines that the position of the PC 300 is not out of the display range of the image display unit 20 (step S53; NO), the control unit 310 determines whether the PC 300 has moved from an outside of the display range of the image display unit 20 into the range of the image display unit 20 *t* (step S55).

In a case where, owing to the movement of the visual field VR, the display unit 330 enters the display range from the state where the display unit 330 has been out of the display range of the image display unit 20 (step S55; YES), the control unit 310 determines that display of the HMD 100 needs to be initialized (step S56). The control unit 310 returns to step S23, and executes again the processing for starting output of the image data. This initialization processing is similar to the processing described at step S38, and in the operation example illustrated in each of FIG. 13 and FIG. 14, the image display unit 20 performs the initialization.

When it is determined that the PC 300 has not moved from the outside of the display range of the image display unit 20 into the range of the image display unit 20 (step S55; NO), the control unit 310 shifts to step S54 and changes the position data.

At step S52, in a manner similar to step S33, in any of a case where the image display unit 20 has moved, and a case where the PC 300 has moved, as long as a relative position between the image display unit 20 and the PC 300 is changed, it is determined that the visual field VR has moved.

When the control unit 310 determines that the visual field VR has not moved (step S52; NO), the control unit 310 determines whether to end the display (step S57). For example, when display end is instructed by an operation on the display unit 330 or the like (step S57; YES), the control unit 310 stops outputting the image data to a connecting device 10 and ends this processing. On the other hand, when the display is to be continued (step S57; NO), the control unit 310 returns to step S52.

In the operation illustrated in FIG. 14, the control unit 120 of the HMD 100 starts processing for acquiring data of the virtual image VD output by the PC 300 and the position data (step S61). The control unit 120 specifies, based on the acquired position data, a position of the display unit 330 in the range in which the image display unit 20 displays an image (step S62).

The control unit 120 executes processing for cutting an image present in the range to be displayed by the image display unit 20 out of the virtual image VD (step S63). The control unit 120 applies mask processing to the cut out image (step S64). The range in which the masking processing is applied at step S64 is identical to the range at step S30 (FIG. 11), and is the range in which the display unit 330 is superimposed on the image to be displayed by the image display unit 20, or the range including a portion superimposed on the display unit 330.

The control unit 120 sets a convergence angle of the image subjected to the masking processing (step S65). At step S65, in a manner similar to the processing executed by the control unit 310 at step S31 (FIG. 11), the control unit 120 sets the convergence angle of the image such that a portion of the virtual image VD to be displayed by the image display unit 20 is visually recognized as a plane including the display unit 330. The control unit 120 generates image data including image data of an image to be displayed by a right display unit 22 of the image display unit 20, and image data of an image to be displayed by a left display unit 24, and starts display (step S66). Here, the control unit 120 adjusts a position of the virtual image VD in an image for the right display unit 22, and a position of the virtual image VD in an image for the left display unit 24 and thus, the control unit 120 can adjust a convergence angle of a left eye LE and a right eye RE of a user.

The control unit 120 determines whether the position data output by the PC 300 has been changed (step S67). When the control unit 120 determines that the position data has been changed (step S67; YES), the control unit 120 determines whether a position of the PC 300 is out of the range in which the image display unit 20 displays an image (step S68). The processing at step S68 is, for example, similar to the processing executed by the control unit 310 at step S34 (FIG. 11).

When the control unit 120 determines that the position of the PC 300 is out of the display range of the image display unit 20 (step S68; YES), the control unit 120 cancels the masking processing applied at step S64 (step S69). The control unit 120 changes, in correspondence to the position data changed, the range to be cut out of the virtual image VD (step S70), and returns to step S67.

When the control unit 120 determines that the position of the PC 300 is not out of the display range of the image display unit 20 (step S68; NO), the control unit 120 determines whether the PC 300 has moved from an outside of the display range of the image display unit 20 into the range of the image display unit 20 (step S71). In a case where the PC 300 enters the display range from the state where the PC 300 has been out of the display range of the image display unit 20 (step S71; YES), the control unit 120 initializes display of the image display unit 20 (step S72). The initialization at step S72 is, for example, similar to the initialization at step S38 (FIG. 11), and the control unit 120 resets application/canceling of the masking process, the range to be cut out of the virtual image VD, or the like to an initial state. The control unit 120 returns to step S61, and performs again the processing for starting the display.

In a case where the PC 300 has not moved from the outside of the display range of the image display unit 20 into the range of the image display unit 20 (step S71; NO), the control unit 120 shifts to step S70.

Additionally, when the control unit 120 determines that the position data has not been changed (step S67; NO), the control unit 120 determines whether to end the display (step S73). For example, when display end is instructed by a command input from the PC 300 or an operation on the operating unit 140 or the like (step S73; YES), the control unit 120 stops the display by the image display unit 20 and ends this processing. On the other hand, when the display is to be continued (step S73; NO), the control unit 120 returns to step S67.

According to this third exemplary embodiment, the PC 300 is configured to specify the relative position of the PC 300 with respect to the image display unit 20, and perform processing for determining the position of the PC 300 in the display range of the image display unit 20, and the HMD 100 is configured to cut an image out of the virtual image VD to cause the image display unit 20 to display the cut out image. Accordingly, since the PC 300 and the HMD 100 are configured to mutually share and execute the processing, the configuration of the HMD 100 is simplified, and thus the HMD 100 can be reduced in a weight and a size. Additionally, since the image display unit 20 is configured to execute the processing for cutting the image out of the virtual image VD, for example, processing such as setting the convergence angle can be executed rapidly in the image display unit 20.

In the operation described in the third exemplary embodiment, processing similar to steps S33 to S38 (FIG. 11) may be executed. In this case, the processing at steps S33, S34, and S37 is preferably executed by the control unit 310. Additionally, preferably, the control unit 120 acquires processing results of steps S33, S34, and S37 executed by the control unit 310, and executes the processing at steps S35, S36, and S38.

4. Fourth Exemplary Embodiment

Figure 15:
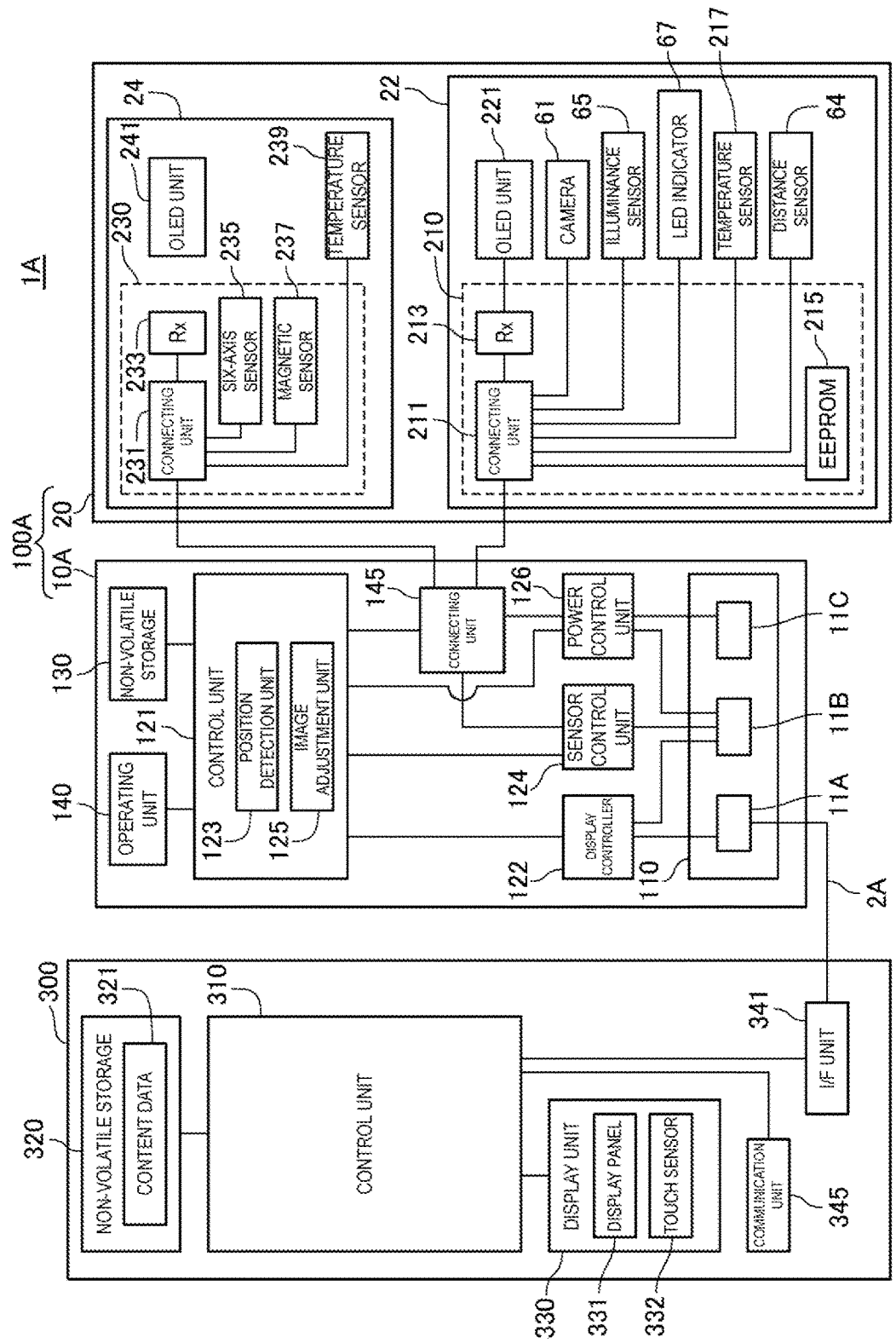
FIG. 15 is a block diagram of respective components constituting a display system in a fourth exemplary embodiment.

FIG. 15 is a block diagram of respective components constituting a display system 1A according to a fourth exemplary embodiment.

The display system 1A includes a configuration in which the HMD 100 in the display system 1 described in the first exemplary embodiment includes a control device 10A instead of the connecting device 10. The control device 10A includes a control unit 121, and the control unit 121 is configured to process image data input from a PC 300. Except for the configurations of the control unit 121 and the related components, the display system 1A includes components similar to the components of the display system 1. The components common to the components of the display system 1 are denoted by identical reference signs and description of the common components will be omitted.

In a manner similar to the control unit 120 (FIG. 5), the control unit 121 includes a processor (not illustrated) such as a CPU or a microcomputer, and is configured to cause the processor to execute a program to control each component of the HMD 100 in cooperation of software and hardware. Additionally, the control unit 121 may include programmed hardware.

The control unit 121 is connected with a non-volatile storage 130, an operating unit 140, and a connecting unit 145. Additionally, the control unit 121 includes a position detection unit 123, and an image adjustment unit 125. In a manner similar to the position detection unit 313, the position detection unit 123 is configured to detect a position of the HMD 100. More specifically, the position detection unit 123 is configured to detect a relative position between the PC 300 and an image display unit 20, based on an output value of a sensor provided in the image display unit 20. Additionally, for example, the processing in which the control unit 310 determines the distance from the captured image data of the camera 61 to the object to be captured as described in the first exemplary embodiment can also be executed by the control unit 121.

The relative position detected by the position detection unit 123 may be a position in a space in which the image display unit 20 and the PC 300 exist. Additionally, the relative position detected by the position detection unit 123 may include a relative direction between the image display unit 20 and a display unit 330. For example, the relative position detected by the position detection unit 123 may be information indicating the position and/or the direction of the display unit 330 with respect to the image display unit 20. Additionally, the relative position detected by the position detection unit 123 may be, for example, information indicating the position and/or the direction of the image display unit 20 with respect to the PC 300. Additionally, the relative position detected by the position detection unit 123 may include, for example, coordinates in a three dimensional coordinate system set in a space in which the image display unit 20 and the PC 300 exist.

The image adjustment unit 125 is configured to perform image processing for image data input to an I/F unit 110. The image processing executed by the image adjustment unit 125 is similar to the processing of the image adjustment unit 315 described in the first exemplary embodiment and the second exemplary embodiment.

For example, the image adjustment unit 125 is configured to perform processing such as resolution conversion (scaling), frame rate conversion, tone correction, and data format change on the image data input to the I/F unit 110, in correspondence to specifications of the HMD 100.

In a manner similar to the display system 1, the display system 1A is configured to execute the calibration processing illustrated in FIG. 7, and the operation illustrated in FIG. 11.

When the display system 1A executes the operation in FIG. 7, steps S13 to S15 are executed by the position detection unit 123. Additionally, when the display system 1A executes the operation in FIG. 11, the position detection unit 123 executes steps S21 and S23, and the image adjustment unit 125 executes steps S22, S24 to S39.

In the fourth exemplary embodiment, the image adjustment unit 125 is configured to set a virtual display area corresponding to the virtual image VD, and dispose image data output by the PC 300 in the virtual display area to generate the virtual image VD. The image adjustment unit 125 is configured to cut the range to be displayed by the image display unit 20 out of the virtual image VD, apply the masking processing as necessary, and cause the image display unit 20 to display the image.

Namely, an HMD 100A includes the control unit 121 configured to determine a relative position of the display unit 330 with respect to the image display unit 20, process image data based on the relative position determined, and cause the image display unit 20 to display an image corresponding to a position of the display unit 330 of an outside scene.

Accordingly, since the HMD 100A determines the relative position of the display unit 330 with respect to the image display unit 20, and generates an image for display to correspond to this relative position, display corresponding to the position of the display unit 330 can be achieved without increasing a load on the PC 300.

Additionally, in a configuration in which the PC 300 mirrors and outputs via the HDMI cable 2A an image identical to the image displayed by the display unit 330, the HMD 100A adjusts a display image of the image display unit 20. Namely, the HMD 100A changes, in correspondence to a direction of the image display unit 20 and a relative position between the image display unit 20 and the PC 300, a display mode of the image to be displayed by the image display unit 20.

Therefore, the display system 1A can achieve the effect of the display system 1 described in the first exemplary embodiment. Further, since the image data can be processed in the HMD 100A, when general-purpose equipment configured to output image data is connected instead of the PC 300, there is an advantage that a display mode can be changed in correspondence to the position or the direction of the image display unit 20.

Note that the invention is not limited to the configurations in the above-described exemplary embodiments, and the invention can be implemented in various aspects without departing from the gist of the invention.

For example, in the above-described exemplary embodiments, the configuration in which the user visually recognizes the outside scene through the display unit is not limited to the configuration in which the right light-guiding plate 261 and the left light-guiding plate 281 transmit the outside light. For example, the invention is applicable to a display device configured to display an image in a state where an outside scene cannot be recognized visually. Specifically, the invention is applicable to a display device configured to display a captured image of the camera 61 for capturing an outside scene, an image or CG generated based on this captured image, an image based on image data stored in advance or based on image data input from an outside, or the like. This kind of display device can include a so-called closed type display device in which an outside scene cannot be recognized visually. Additionally, as described in the above-described exemplary embodiments, AR display in which an image is superimposed on a real space and is displayed in the real space, or Mixed Reality (MR) display in which a captured image in a real space and a virtual image are combined may be used. Alternatively, the invention is applicable to a display device configured to perform no processing of Virtual Reality (VR) display for displaying a virtual image. For example, a display device configured to display image data input from an outside or an analogue image signal is also, as a matter of course, encompassed as the application of the invention.

Additionally, instead of the image display unit 20, for example, an image display unit of another type such as an image display unit worn as a hat may be adopted, as long as the image display unit includes a display unit configured to display an image in correspondence to a left eye of a user, and a display unit configured to display an image in correspondence to a right eye of the user. Additionally, the display device in the invention may be configured, for example, as a head mounted display mounted on a vehicle such as a car, and an airplane. Additionally, the display device in the invention may be configured, for example, as a head mounted display built in a body protector such as a helmet. In this case, a portion positioning a position with respect to a body of a user, and a portion positioned with respect to such a portion can be mounted parts.

Further, the HMD 100A in the fourth exemplary embodiment may include a configuration in which the control device 10A and the image display unit 20 are integrally constituted and are worn on a head of a user. Additionally, a note type computer, a tablet computer, a portable electronic device including a game machine, a portable telephone, a smartphone, and a portable media player, other dedicated equipment, or the like may be used as the control device 10A. Additionally, in the above-described exemplary embodiments, a configuration in which the connecting device 10 and the image display unit 20 are connected via a radio communication line may be adopted.

Additionally, equipment connected with the HMD 100 or 100A in the display system 1 is not limited to the PC 300. The equipment may be, for example, a stationary television set, or a monitor for a stationary personal computer. Additionally, a projector configured to project an image on a display surface may be used instead of the PC 300, and in this case, the projection surface on which the projector projects the image corresponds to the first display unit. Additionally, other than the above-described equipment, instead of the PC 300, a portable or a stationary electronic device can be used. The PC 300 or various electronic devices used instead of the PC 300 may be connected wirelessly with the HMD 100 or 100A. For example, instead of the connector 11A, a radio image communication interface such as Miracast (trade name) or WirelessHD (trade name) may be used. Additionally, instead of the connector 11B, a wireless LAN (including WiFi (trade name)) may be used, or Bluetooth (trade name) may be used.

Additionally, at least a portion of each function block illustrated in the block diagram may be configured to be achieved with hardware, or may be configured to be achieved in cooperation of hardware and software, and the invention is not limited to the configuration in which independent hardware resources are disposed as illustrated in the figure.

The entire disclosure of Japanese Patent Application No. 2017-246853, filed Dec. 22, 2017 and 2018-172773, filed Sep. 14, 2018 are expressly incorporated by reference herein.

What is claimed is:

1. A display system comprising:
an electronic device that generates an image and that includes a first display unit displaying a first area of the image; and
a head mounted type display device connected to the electronic device, wherein
the electronic device includes
an output unit configured to output an image,
the head mounted type display device includes
an acquisition unit configured to acquire the image output by the electronic device,
a second display unit configured to superimpose a second area of the image on an outside scene visually recognized in a state where the head mounted type display device is worn, and to display the second area of the image, and
a display controller configured to:
dispose the image in a virtual display area in correspondence to a position of the electronic device such that the image is aligned with the position of the electronic device,
cause the second display unit to display the second area of the image acquired by the acquisition unit such that:
when the electronic device is in the outside scene, the second area of the image includes the first area of the image, and
when the electronic device is not in the outside scene, the second area of the image does not include the first area of the image,
when the electronic device is in the outside scene, execute a masking processing to the first area of the image in the second area of the image, the masking processing including changing color data of pixels to a dark color or a black color, and
cause the second display unit to display the second area of the image including the first area of the image on which the masking processing has been executed.

2. The display system according to claim 1, wherein the electronic device includes an electronic device control unit configured to generate an image corresponding to the virtual display area wider than the first display unit, cause the first display unit to display a portion of the image generated, and cause the output unit to output at least a portion of the image generated, and
the display controller provided in the head mounted type display device is configured to cause the second display unit to display at least a portion of an image output by the electronic device, in correspondence to a position of the electronic device.

3. The display system according to claim 2, wherein the electronic device control unit is configured to cause the output unit to output the image obtained by removing a portion displayed by the first display unit from the image generated in correspondence to the virtual display area, and
the display controller provided in the head mounted type display device is configured to cause the second display unit to display an image output by the electronic device.

4. The display system according to claim 3, wherein the display controller provided in the head mounted type display device is configured to cause the image output by the electronic device to be displayed around the first display unit visually recognized as an outside scene.

5. The display system according to claim 3, wherein the electronic device control unit is configured to, based on a relative position of the first display unit with respect to the second display unit, cause the first display unit to display a portion of the image generated in correspondence to the virtual display area, and cause the output unit to output the image obtained by removing a portion displayed by the first display unit.

6. The display system according to claim 5, wherein the electronic device control unit is configured to, based on a relative position of the first display unit with respect to the second display unit, cause the output unit to output an image obtained by masking a portion displayed by the first display unit, of the image generated in correspondence to the virtual display area.

7. The display system according to claim 2, wherein the electronic device control unit is configured to cause the output unit to output the image generated in correspondence to the virtual display area, and the display controller provided in the head mounted type display device is configured to cause the second display unit to display an image obtained by cutting out a portion of an image output by the electronic device.

8. The display system according to claim 7, wherein the display controller is configured to, based on a relative position of the first display unit with respect to the second display unit, extract a portion of the image acquired by the acquisition unit, and cause the second display unit to display the portion.

9. The display system according to claim 2, wherein the electronic device control unit is configured to determine a position of the virtual display area, based on a position of the electronic device in a real space, and adjust a display mode of the second display unit, based on a relative position between the virtual display area and the second display unit.

10. The display system according to claim 2, wherein the electronic device control unit is configured to initialize a display mode of the image by using a position of the first display unit as a reference, when the electronic device control unit detects the first display unit being present in the range where the first display unit is visually recognized through the second display unit.

11. The display system according to claim 1, wherein the second display unit includes a display unit for a left eye configured to emit imaging light toward a left eye of a user wearing the head mounted type display device, and a display unit for a right eye configured to emit imaging light toward a right eye of the user, and in correspondence to a position of the first display unit visually recognized as an outside scene by the second display unit, a display position by the display unit for a left eye, and a display position by the display unit for a right eye are controlled, and a convergence angle of an image displayed by the second display unit is adjusted.

12. The display system according to claim 11, wherein the second display unit includes an optical system capable of adjusting a visual recognition distance that the user perceives to an image displayed by the second display unit, and the optical system is controlled in correspondence to a convergence angle of an image displayed by the second display unit.

13. An electronic device connected with a head mounted type display device configured to superimpose a second area of an image on an outside scene visually recognized in a state where the head mounted type display device is worn, and to display the second area of the image, the electronic device comprising:

a first display unit displaying a first area of the image;
an output unit configured to output the image to the head mounted type display device; and
a control unit configured to:
based on a relative position of the first display unit with respect to a second display unit provided in the head mounted type display device, dispose the image in a virtual display area in correspondence to a position of the first display unit such that the image is aligned with the position of the first display unit,
cause the second display unit to display the second area of the image such that:
when the electronic device is in the outside scene, the second area of the image includes the first area of the image, and
when the electronic device is not in the outside scene, the second area of the image does not include the first area of the image,
when the electronic device is in the outside scene, execute a masking processing to the first area of the image in the second area of the image, the masking processing including changing color data of pixels to a dark color or a black color, and
cause the second display unit to display the second area of the image including the first area of the image on which the masking processing has been executed.

14. A display method using an electronic device and a head mounted type display device, the display method comprising:
outputting an image to the head mounted type display device by the electronic device;
acquiring the image by the head mounted type display device;
disposing the image in a virtual display area in correspondence to a position of the electronic device unit such that the image is aligned with the position of the electronic device;
superimposing the image in correspondence to the position of the electronic device that is visually recognized as an outside scene in a state where the head mounted type display device is worn;
displaying a first area of the image in a first display unit of the electronic device,
displaying a second area of the image in a second display unit of the head mounted type display device such that:
when the electronic device is in the outside scene, the second area of the image includes the first area of the image, and
when the electronic device is not in the outside scene, the second area of the image does not include the first area of the image,
when the electronic device is in the outside scene, executing a masking processing to the first area of the image in the second area of the image, the masking processing including changing color data of pixels to a dark color or a black color, and
causing the second display unit to display the second area of the image including the first area of the image on which the masking processing has been executed.

* * * * *